United States Patent
Anderson et al.

(10) Patent No.: US 10,015,785 B2
(45) Date of Patent: *Jul. 3, 2018

(54) SUSPENDING A CONNECTION IN A WIRELESS COMMUNICATION SYSTEM

(71) Applicant: BlackBerry Limited, Waterloo (CA)

(72) Inventors: Nicholas William Anderson, Exeter (GB); Richard Charles Burbidge, Shrivenham (GB); Gordon Peter Young, Leamington Spa (GB)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/682,303

(22) Filed: Aug. 21, 2017

(65) Prior Publication Data

US 2017/0347346 A1 Nov. 30, 2017

Related U.S. Application Data

(63) Continuation of application No. 15/356,107, filed on Nov. 18, 2016, now Pat. No. 9,743,396, which is a
(Continued)

(51) Int. Cl.
*H04W 74/02* (2009.01)
*H04W 72/04* (2009.01)
(Continued)

(52) U.S. Cl.
CPC ....... *H04W 72/042* (2013.01); *H04W 76/028* (2013.01); *H04W 76/06* (2013.01); *H04W 76/068* (2013.01); *H04W 76/046* (2013.01)

(58) Field of Classification Search
CPC . H04W 72/042; H04W 76/028; H04W 76/06; H04W 76/068; H04W 76/046
See application file for complete search history.

(56) References Cited

U.S. PATENT DOCUMENTS 9,504,081 B2 * 11/2016 Anderson ........... H04W 76/028
9,743,396 B2 * 8/2017 Anderson ........... H04W 76/028
(Continued)

FOREIGN PATENT DOCUMENTS

EP 2617261 7/2013
WO 2012/034580 3/2012

OTHER PUBLICATIONS

3GPP TS 36.331 V10.2.0 (Jun. 2011); "3rd Generation Partnership Project; Technical Specification Group Radio Access Network; Evolved Universal Terrestrial Radio Access (E-UTRA); Radio Resource Control (RRC); Protocol Specification (Release 10)"; Jun. 24, 2011;18 pages.
(Continued)

*Primary Examiner* — Mohammad S Anwar
(74) *Attorney, Agent, or Firm* — Fish & Richardson P.C.

(57) ABSTRACT

An evolved Node B (eNB) includes a memory and at least one hardware processor communicatively coupled with the memory and configured to: determine to suspend an established radio resource control (RRC) connection with a user equipment (UE), where suspension causes the established RRC connection to be a suspended RRC connection that disables user plane data communications between the UE and the eNB; in response to a determination to suspend the established RRC connection, store RRC connection data related to the established RRC connection; and transmit, to the UE, an RRC connection suspend command instructing the UE to store the RRC connection data and suspend the established RRC connection.

20 Claims, 23 Drawing Sheets

Related U.S. Application Data continuation of application No. 14/238,581, filed as application No. PCT/EP2012/065552 on Aug. 8, 2012, now Pat. No. 9,504,081.

(60) Provisional application No. 61/523,009, filed on Aug. 12, 2011, provisional application No. 61/523,016, filed on Aug. 12, 2011, provisional application No. 61/523,039, filed on Aug. 12, 2011, provisional application No. 61/523,053, filed on Aug. 12, 2011, provisional application No. 61/522,998, filed on Aug. 12, 2011, provisional application No. 61/523,021, filed on Aug. 12, 2011.

(51) Int. Cl.
    *H04W 76/06*     (2009.01)
    *H04W 76/02*     (2009.01)
    *H04W 76/04*     (2009.01)

(56) References Cited

U.S. PATENT DOCUMENTS

| | | |
|---|---|---|
| 2003/0093535 A1 | 5/2003 | Choi et al. |
| 2006/0035642 A1 | 2/2006 | Farnsworth et al. |
| 2008/0167089 A1 | 7/2008 | Suzuki et al. |
| 2010/0074246 A1 | 3/2010 | Harada et al. |
| 2010/0130205 A1 | 5/2010 | Hoon et al. |
| 2010/0184438 A1 | 7/2010 | Wu |
| 2013/0260740 A1 | 10/2013 | Rayavarapu |

OTHER PUBLICATIONS

3GPP TS 36.300 V10.4.0 (Jun. 2011); "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 10)"; Jun. 22, 2011; pp. 1-194.

3GPP TS 25.331 V4.1.0 (Jun. 2001); "3rd Generation Partnership Project; Technical Specification Group Radio Access Network; RRC Protocol Specification (Release 4)"; Jun. 1, 2001; pp. 1-811.

International Search Report and Written Opinion of the International Searching Authority issued in International Application No. PCT/EP2012/065552 dated Nov. 23, 2012; 13 pages.

International Preliminary Report on Patentability issued in International Application No. PCT/EP2012/065552 dated Feb. 27, 2014; 8 pages.

Communication Pursuant to Article 94(3) EPC issued in EP Application No. 12751027.9 dated Mar. 5, 2015.

Communication Pursuant to Article 94(3) EPC issued in European Application No. 12751027.9 dated Jan. 12, 2016.

Communication Pursuant to Article 94(3) EPC issued in European Application No. 12751027.9 dated Dec. 22, 2016.

* cited by examiner

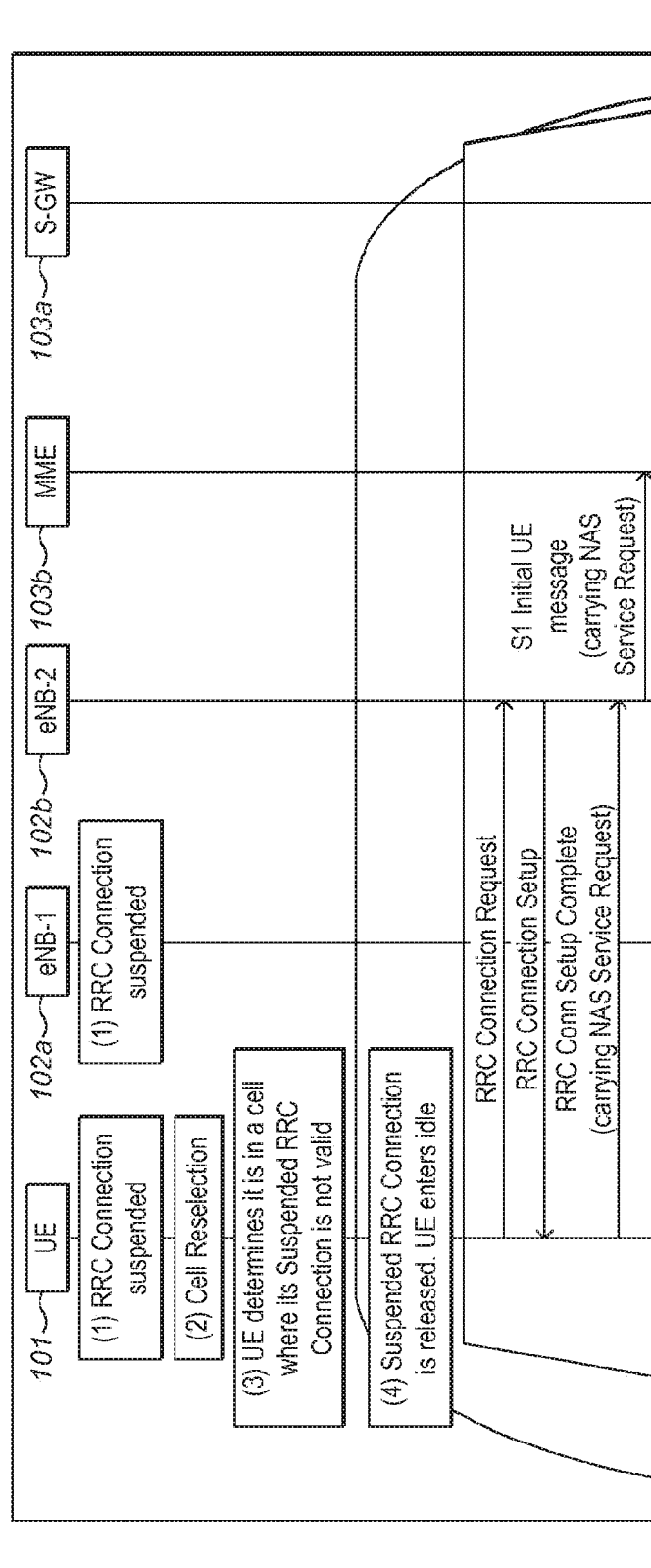

SUSPENDING A CONNECTION IN A WIRELESS COMMUNICATION SYSTEM

CROSS REFERENCE TO RELATED APPLICATIONS

This application is a continuation of U.S. patent application Ser. No. 15/356,107 filed on Nov. 18, 2016, now U.S. Pat. No. 9,743,396, which is a continuation of U.S. patent application Ser. No. 14/238,581 filed on Feb. 12, 2014, now U.S. Pat. No. 9,504,081, which is a U.S. National Stage of PCT/EP2012/065552 filed on Aug. 8, 2012, which claims priority to U.S. Provisional Application No. 61/523,021, filed on Aug. 12, 2011, U.S. Provisional Application No. 61/522,998, filed on Aug. 12, 2011, U.S. Provisional Application No. 61/523,009, filed on Aug. 12, 2011, U.S. Provisional Application No. 61/523,039, filed on Aug. 12, 2011, U.S. Provisional Application No. 61/523,053, filed on Aug. 12, 2011, U.S. Provisional Application No. 61/523,016, filed on Aug. 12, 2011, the entire contents of which are hereby incorporated by reference.

TECHNICAL FIELD

The present disclosure relates to a wireless communication system and in particular the handling of connections between nodes in a wireless communication system.

BACKGROUND

Wireless communications systems are known that enable wireless data transfer between one or more user equipment (UE) and one or more Base Stations (BS) arranged to provide nodes of a cellular RAN. An increase in the prevalence of UEs operating on wireless cellular communications systems squires that such networks carry and support a wide variety of data traffic types and services. UEs can be viewed as generic computing platforms with wireless connectivity, capable of running a wide-ranging variety of applications and services that are either pre-installed by the device manufacturer or are installed/downloaded by the user according to the user's specific usage requirements. The applications themselves may originate from a correspondingly wide-ranging group of software houses, manufacturers and 3$^{rd}$ party developers. Such UE platforms may include mobile devices such as mobile telephones, 'smartphones' personal digital assistants, handheld or laptop computers, tablet computers and similar mobile devices having wireless communications connectivity, or similarly the UE referred to herein could include fixed devices that are relatively immovable in normal use, such liked devices having wireless connectivity to enable them to communicate using the wireless communications system. The UE platforms may also include other device types comprising embedded communications connectivity, such as household appliances, utility meters and security and surveillance equipment, or consumer electronics devices such as still or video cameras, audio/visual entertainment equipment and gaming platforms.

Wireless communication networks often distinguish between user-plane traffic (which may be considered as carrying application-level user data) and control-plane traffic (which may be considered as signalling used to enable or support transfer of the user plane data via the wireless communication network, including for example mobility control and Radio Resource Control (RRC) functionality). Examples of user plane traffic and services carried by wireless communication networks include voice, video, internet/web browsing sessions, upload/download file transfer, instant messaging, e-mail, navigation services, RSS feeds and streaming media. Examples of control plane traffic include core-network mobility and attachment control (so-called Non-Access Stratum (MAS) signaling), radio access network control (such as Radio Resource Control (RRC)), and session control signalling.

Outside of for "above") the radio and core network communication layers, applications, may utilise or combine a multitude of internet-based for other proprietary) protocols to achieve a desired result when provisioning for a specific service. For example, a navigation application may utilise TCP for file transfer of mapping data from a server to a device but may also employ protocols to support periodic or aperiodic keep-alive signalling towards the navigation server to maintain the application-level connection in the presence of intermediary network nodes such as stateful firewalls. Similarly, an e-mail application may employ particular synchronisation protocols to align the mailbox contents on the UE with those in an e-mail server, but may also employ periodic or aperiodic server polling mechanisms to check for new e-mail. The present disclosure concerns operating wireless communication systems to provide UEs With connectivity to support such applications.

For a more complete understanding of this disclosure, reference is now made to the following detailed description that sets out certain embodiments, taken in connection with the drawings, which can be briefly described as follows.

BRIEF DESCRIPTION OF THE DRAWINGS

FIG. 8 is a message sequence chart illustrating an exemplary RRC connection suspension process in a wireless communication system in accordance with the present disclosure.

DETAILED DESCRIPTION

Figure 1:
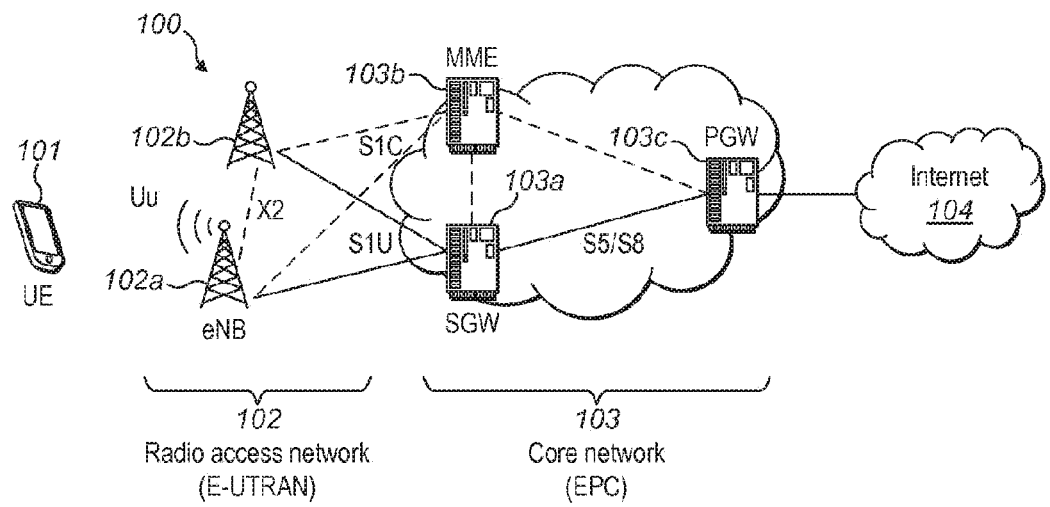
FIG. 1 shows a wireless communication system including an LTE Radio Access Network coupled to an Evolved Packet Core Network, further coupled to an external packet data network such as the public internet.

Many UE applications require or benefit from so-called always-on connectivity, such that a seamless and continuous connection experience is delivered to the user when using the UE and the applications running thereon. Whist the appearance of seamlessness is presented to the user at the service level, this may in fact be accomplished without permanent or continuous connectivity at all protocol levels beneath the application layer. Instead, it may be the case that connections are established and released on a regular or as-needed basis in order to deliver the user data when required but to allow for certain power efficiency or system efficiency savings in the UE during the intervening periods of time. However, a frequent establishment and release of these connections may also entail significant use of system resources or result in additional signalling loads within the network, and the associated system resource and control overheads may become large. For some application traffic, this may counteract the power or system efficiency benefits of employing such an "as-needed" connection establishment strategy. Systems and methods which are able to reduce these system resource and control overheads are therefore desirable such that overall system and power efficiencies are improved when attempting to deliver a seamless user or service experience at the application level via the communications network.

The prevalence of a plethora of application types, services, end means of service delivery in wireless communications systems results in a corresponding plethora of data traffic distributions and statistics that are presented to the wireless communication networks for delivery. Wireless communication networks are therefore less able to predict traffic profiles and distributions, and must be designed to adapt the connections and the assigned transmission resources to the dynamically varying (potentially "bursty") traffic loads.

In order to do so, wireless radio access networks can include dynamic scheduling such that a quantity of assigned shared radio resources may be varied in rapid response to data demand (e.g. data buffer status). Such dynamic scheduling typically operates on a time scale of one to a few milliseconds. At a time-scale above this (operating in the region of 100 ms to a few seconds), wireless communication networks often also employ a state machine-oriented process to adapt a radio connection state or sub-state to the degree of observed traffic activity. Radio connection states or sub-states may differ in numerous ways, including: the degree of connectivity offered, the quantity of system resources that are reserved or used for the connection, and the amount of UE battery power consumed.

The connectivity level can be characterised as a combination of various connectivity attributes such as:

Location granularity: The accuracy to which the wireless communication network, tracks the current location of the UE (e.g. to the cell level for more active UEs, or to only a group of cells for less active UEs)

Mobility control: The decision to change the cell to which the UE is associated may be taken by the network (network controlled mobility) or by the UE (UE controlled mobility), in the case of network controlled mobility a UE may be instructed to perform measurements and report measurement results to the network in order to assist the network in making the decision to perform a handover. Once a handover decision is made the network will typically prepare any necessary resources in the target cell before instructing the UE to change cell by sending a handover command, in the case of UE controlled mobility, the UE will perform measurements on neighbouring cells and use these measurements in making a decision to perform a cell reselection. The network can control the decision process by sending various cell rejection parameters (e.g. threshold, offsets, etc) in broadcast system information. Network controlled mobility (handover) requires more over the air signaling, network internal signalling, and network processing resource than UE controlled mobility.

Assigned resources: The presence, absence, type or amount of radio transmission resources available to the UE for performing communication, as a function of expected activity level Tx/Rx Readiness: The power consumed by UEs is often a function of their "readiness" to transmit or receive. For example, a UE must permanently activate its receiver in order to receive downlink communication from a basestation if the data may arrive at any given instant, resulting in high power consumption and battery drain. To save power, discontinuous reception (DRX) is often employed, allowing the UE to "sleep" and turn off its receiver at certain times. The basestation (BS) must take the UE's DRX pattern into account when determining the times at which it will be able to successfully deliver data to the UE. The activity cycle of a DRX pattern often varies as a function of the assigned radio connection state or sub-state.

Interfaces or bearers established: End-to-end communications (for example from a UE to a core network gateway or egress node towards external networks such as the internet) may require that user-specific connections (or bearers) are established between all participating network nodes or entities. The establishment of some of these interfaces may be associated with the radio connection state or sub-state as a function of the current activity level.

Disclosed herein are methods, apparatuses and software for use in a wireless communications system to suspend and handle the reactivation of a Radio Resource Control (RRC) connection for carrying user-plane and control plane data between a UE and a RAN. Also disclosed herein are methods, apparatuses and software for handling mobility control and downlink data for a UE for which an RRC connection is suspended.

Long Term Evolution (LTE) is a Third Generation Partnership Project (3GPP) standard for wireless communication network technology. An illustrative example of a wireless communication system 100 supporting communications in accordance with LTE is shown in FIG. 1.

The following detailed description is set out in the context of a wireless communication system supporting LTE, but it should be understood that the applicability of the present disclosure is in no way limited to LTE. Indeed the broad concepts of UE-RAN RRC connection suspension and handling thereof disclosed herein are equally applicable in other wireless communication systems supporting other technologies and protocols, whether currently known or not yet envisaged. In this respect, the disclosure should in no way be limited to the following illustrative implementations, drawings and techniques, but may be modified and used in other wireless communication systems without departing from the scope of the appended claims, due regard being given to all equivalents.

LTE describes a plurality of requirements for wireless communications systems in evolved or advanced cellular broadband technologies. Such requirements include providing an Evolved Universal Mobile Telecommunications System (UMTS) Terrestrial Radio Access Network (E-UTRAN)—i.e. RAN 102. As shown in FIG. 1, RAN 102 provides a high-speed radio access technique to support wireless communications between UE 101 and one or more BS acting as nodes of the RAN 102 to meet the increased network demands. Including improving user throughputs and network capacity, reducing latency, and increasing mobility. The LTE RAN 102 shown in FIG. 1 comprises one node type acting as the node base stations (BS)—i.e. evolved Node Bs (eNB) 102a,b . . . n, advanced LTE equipment that supports an E-UTRAN air interface, and which can provide at least some of the functionalities of the BS, wireless access points, and other systems and devices some of which may be more evolved than the equivalent equipment in a traditional wireless telecommunications system. The term eNB or access device may be used herein to refer to any device, existing or advanced, that may be used to gain access to a network. Such advanced or next generation equipment may be referred to herein as long-term evolution (LTE) equipment.

An eNB may support communications with UEs via one or more cells. A communication between an eNB and a UE may comprise communication via a single cell of the eNB or may comprise simultaneous or non-simultaneous communication via more than one cell.

In some implementations, the functionality of an eNB may be self-contained within one physical node or entity, whilst in other implementations, said functionality may be distributed between more than one physical node or entity with interconnections therebetween.

As can be seen in FIG. 1, the LTE wireless communication network 100 provides a Uu radio interface between the UE 101 and the eNB 102a of the RAN 102 to facilitate radio communications therebetween.

LTE uses an Evolved Packet Core (EPC) network architecture for the Core Network (CN) 103 to support the RAN 102 (in the LTE case, the E-UTRAN). Thus, as shown in FIG. 1, the eNB RAN nodes 102a,b . . . n form connections with one or more nodes in the EPC CN 103 (described below). The EPC network architecture transports protocols such as Transmission Control Protocol (TCP)/internet Protocol (IP) for supporting IP based services, such as voice, video, other media, and messaging, with end-to-end Quality of Service (QoS). The EPC network architecture also enables improved connections add handover to other fixed-line and wireless access technologies with improved mobility.

The LTE Radio Access Network 102 (E-UTRAN) coupled to an EPC CN 103 may be further coupled to an external packet data network such as the public internet 104.

The EPC CN 103 shown in FIG. 1 comprises three node types—the Serving Gateway (SGW) 103a routes user-plane data within the core network, the Mobility Management-Endpoint (MME) 103b handles mobility and connection control between the UE and the core network, and the Packet Gateway (PGW) 103c ingress/egress node routes data between the core network and external networks. During a communications session between the UE 101, eNB 102a and CN 103 an 'S1' network interface between the RAN 102 and CN 103 is formed, including a control plane bearer connection 'S1-MME' (sometimes referred to as 'S1c') 'S1-MME' between the eNB 102a and MME 103b, and a user plane bearer connection 'S1u' between the eNB 102a and SGW 103a. An 'S5/S8' interface between the SGW 103a and PGW 103c provides user plane communications therebetween. MME 103b may be connected to SGW 103a, for example via an 'S11' interface.

Figure 2:
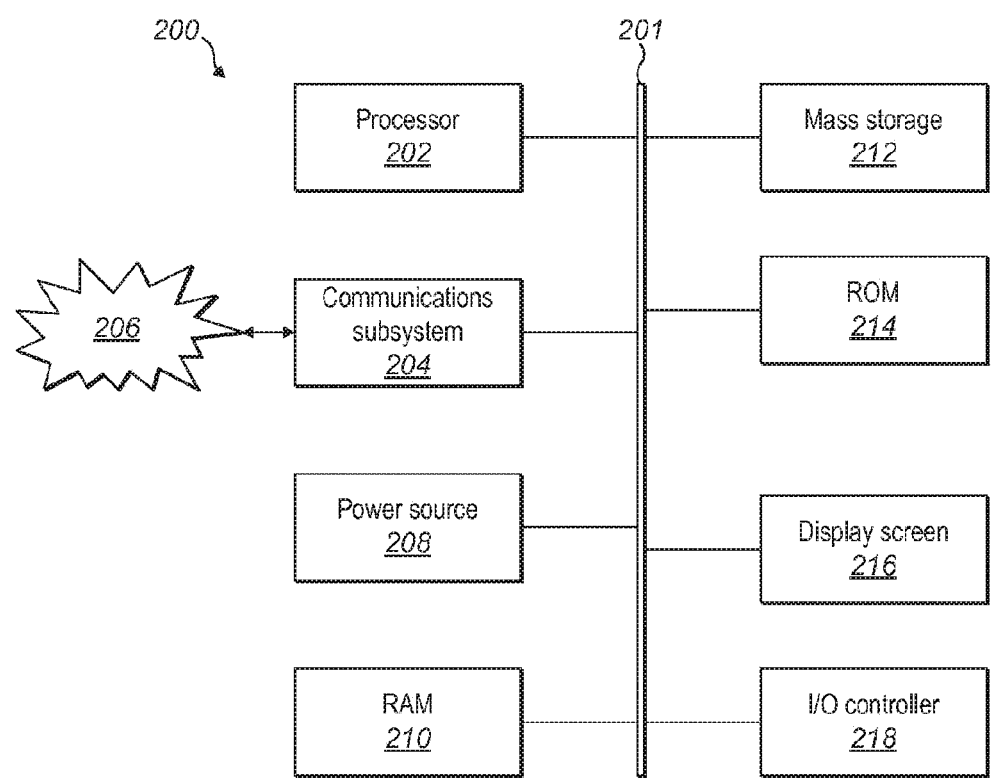
FIG. 2 shows a block diagram of selected components of an example UE for use in a wireless communication system in accordance with the present disclosure.

FIG. 2 shows a block diagram illustrating some example components comprised in an example UE 200 that can be used in the LTE-enabled wireless communications system as shown in FIG. 1. The UE 200 may be a wireless device and its associated Universal Integrated Circuit Card (UICC) that includes a Subscriber Identity Module (SIM) application, a Universal Subscriber identity Module (USIM) application, or a Removable User identity Module (R-UIM) application or the UE 200 might be the device itself without such a card.

UE 200 includes multiple components linked by a communications bus 201. A processor 202 controls the overall operation of the UE 200. Communication functions, including data and voice communications, are performed through a communication subsystem 204. The communication subsystem 204 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WIMAX) devices, and/or other well-known devices for connecting to networks. The communication subsystem 204 may enable the processor 202 to communicate with the internal or one or more telecommunications networks or other networks from which the processor 202 might receive information or to which the processor 202 might output information. In the context of FIG. 1, the communication subsystem 204 receives messages from and sends messages to wireless network 206 which may be the RAN 102 shown in FIG. 1 for voice communications or data communications or both. A power source 208, such as one or more rechargeable batteries or a port to an external power supply, powers the UE 200.

The processor 202 interacts with other components of the electronic device including Random Access Memory (RAM) 210, mass storage 212 (including but not limited to magnetic and optical disks, magnetic tape, solid state drives or RAID arrays), Read Only Memory (ROM) 214 and display screen 216, which may be, for example, a Liquid Crystal Display (LCD). An i/o controller 218 sends and receives signals relative to one or more user control devices, such as a touch sensitive overlay on the display screen 216 to enable user interaction with the UE 200.

The processor 202 executes instructions, code, software or computer programs it may access from communications subsystem 204, RAM 210, mass storage 212 or ROM 214. The processor 202 may comprise one or more data processing units or CPU chips. The processor 202 may execute the instructions solely by itself, or in concert with other locally or remotely provided data processing components or other components not shown in FIG. 2. In particular, the processor 202 is capable of carrying out instructions such that the UE 200 is operable to perform wireless communications in an LTE network in accordance with the disclosure set out below.

Figure 3:
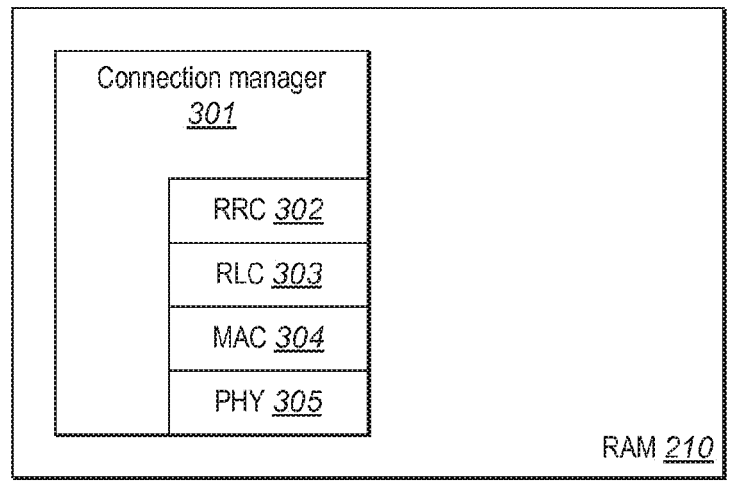
FIG. 3 shows an illustration of a control manager in a RAM of the UE shown in FIG. 2 for facilitating communications with a wireless communication system in accordance with the present disclosure.

For example, referring to FIG. 3, the processor 202 may carry out instructions to instantiate and maintain a communications manager 301 in RAM 210 that in use operates the communications subsystem 204 to perform signalling to interact with RAN 102.

The communications manager 301 may instantiate, for example in the RAM 110 of UE 201, an LTE protocol stack to provide, at the Access Stratum layers of LTE, one or more of a Radio Resource Control (RRC) signalling layer 302 that is typically responsible for the control of radio related functions, a Radio Link Control (RLC) signalling layer 303 that is typically responsible for the retransmission of lost data, a Medium Access Control (MAC) signalling layer 304 that is typically responsible for controlling access to the Physical Layer (PHY) 305. Of course, layers of the protocol stack may be implemented elsewhere, for example the MAC and PHY signalling may be provided in the UE by firmware or hardware and so not maintained m RAM 110. Indeed, the implementation of the protocol stack in the UE shown in FIG. 3 is only one example of many possibilities within the scope of the present disclosure, and is provided for explanatory purposes only.

The LTE Physical Layer (PHY) uses advanced technologies, including Orthogonal Frequency Division Multiple Access (OFDMA), multiple-input and multiple-output (MIMO) delta transmissions, and smart antennas to meet the network demands above. The LTE PHY uses OFDMA for downlink transmissions, for instance from a BS to a UE, which can communicate by transmitting signals throughout a geographical region known as a cell. Additionally, Within one carrier, the LTE PHY uses Single Carrier Frequency Division Multiple Access, (SC-FDMA) for uplink transmissions, for instance from the UE to the BS. The OFDMA and SC-FDMA technologies facilitate in increase in the system capacity and throughput when performing communications via an associated spectrum or bandwidth.

As mentioned a hove, the LTE system includes protocols such as a Radio Resource Control (RRC) protocol, which is responsible for the assignment, configuration and release of connections and radio resources between the UE 101 and the eNBs 102a,b, . . . n of RAN 102 or other access or LTE equipment. The RRC protocol is described in detail in the 3GPP TS 36.331 specifications. According to the RRC protocol, the two basic RRC connection modes for the UE in LTE are defined as "idle mode" and "connected mode."

During the connected mode or state, the UE 101 may exchange signals with the network and perform other related operations, including the ability to perform user-plane communications with the network, while during the idle mode or state, the UE 101 may shut down at least some of its abilities and operations, and is no-longer able to perform user-plane communications with the network. Idle and connected mode behaviours are described in detail in the Third Generation Partnership Project (3GPP; specifications TS 36.304 and TS 36.331.

Figure 4:
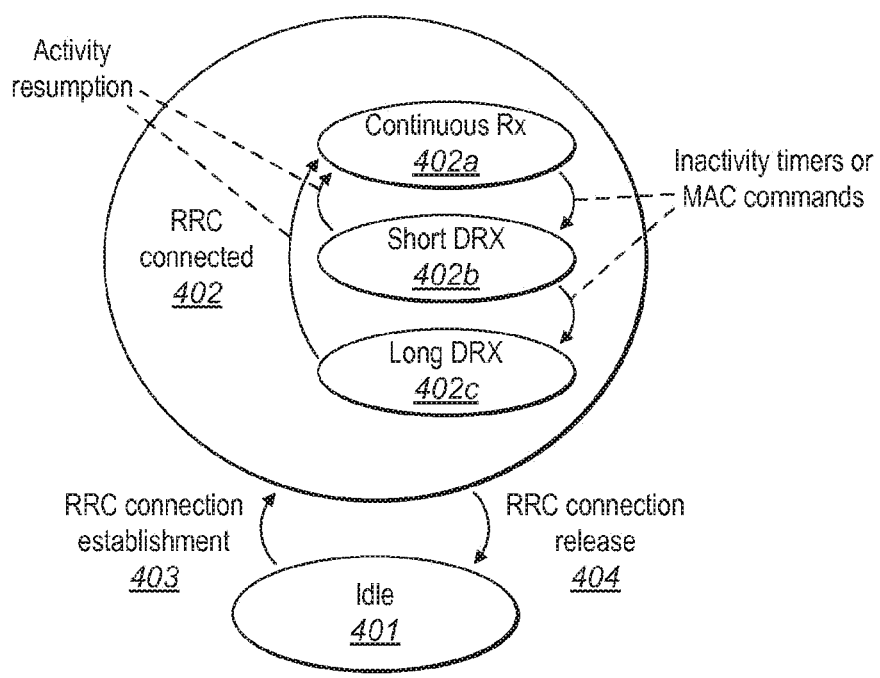
FIG. 4 illustrates the RRC connection states, DRX substates and the transitions therebetween in LTE.
Figure 5:
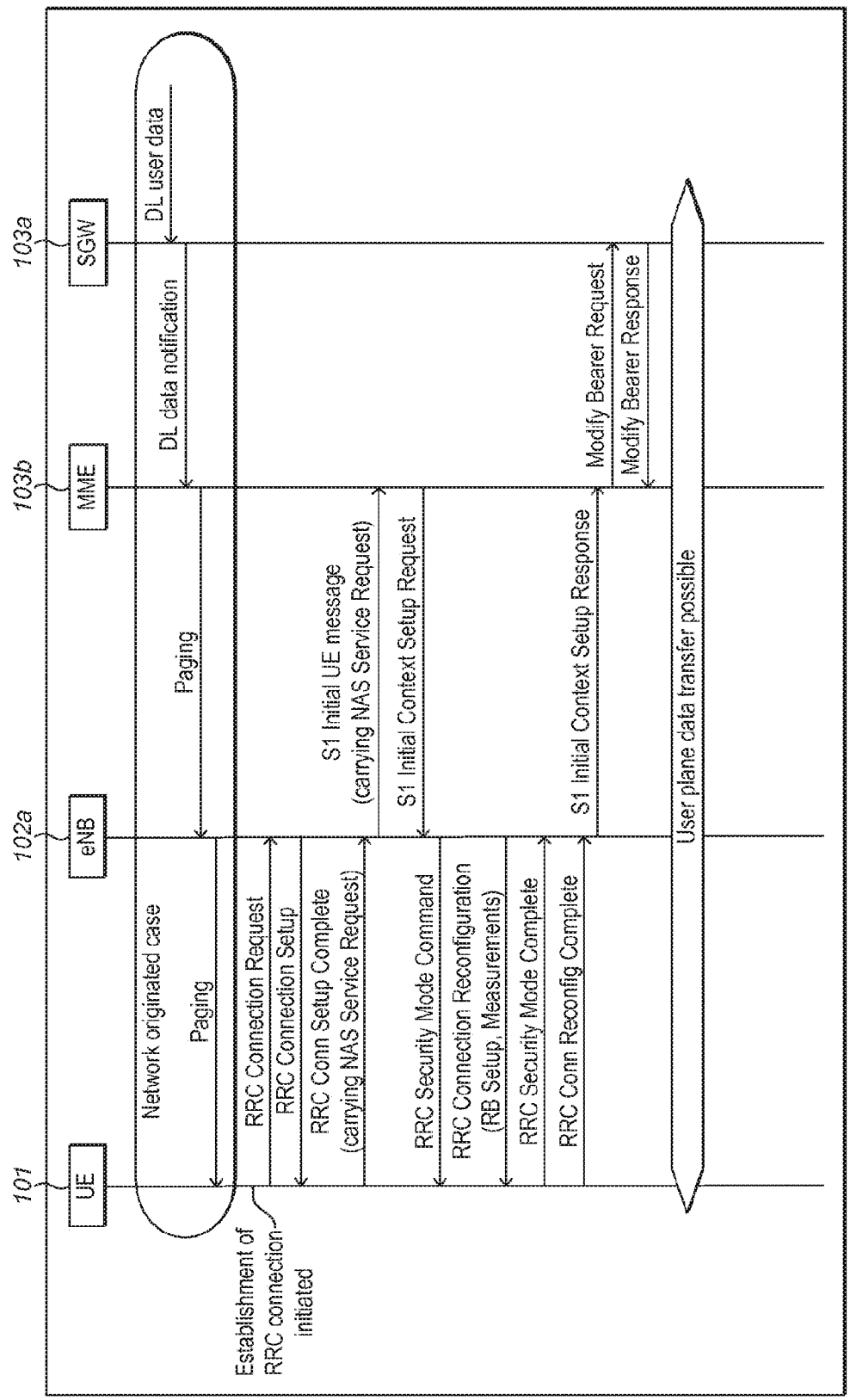
FIG. 5 is a message sequence chart illustrating a normal RRC connection procedure in a wireless communication system in which no RRC connection suspension functionality is provided.

FIG. 4 illustrates the RRC state transitions for LTE. Transitions between idle mode 401 and connected mode 402 in LTE are effected via explicit RRC connection establishment 403 (or setup) and release 404 procedures and involve associated signalling overheads. During normal idle mode procedures, should a need for user plane communications arise, an RRC connection is established via the currently-camped cell. The sequence of messages exchanged during a normal RRC connection establishment to transition between idle mode and connected mode in LTE is shown in FIG. 5. If the connection is UE-originated, an RRC connection request message is sent (initiated using the PRACH random access channel) by UE 101. Conversely, if the connection is network-originated, the MME 103a first requests for all eNBs 102a,b . . . n within the known tracking area to send a paging message to the UE 101 in order to stimulate the UEs sending of an RRC connection request message.

Within the Connected Mode 402, UE 101 may implement DRX procedures, these being controlled within the Medium Access Control (MAC) layer. The DRX pattern is defined via the use of multiple timers and processes that may be triggered by data activity or other events. However, the overall degree of DRX may be conceptualised to exist in one of three predominant modes, wherein one of these modes may be in use at any one time. It is therefore possible to consider these DRX modes as MAC sub-states of the RRC connected mode 402, each associated with a DRX level:

Continuous Reception 402a: No DRX—the receiver of UE 101 is always on and ready to receive user plane data over the RRC connectors.

Short DRX 402b: The UE is allowed to turn off its receiver (sleep, or DRX) for all but M out of N sub-frames (where a sub-frame is a 1 ms unit of transmission time in the LTE system), where M is a small value, such a 1 or 2, end N is a relatively small value, such as 8.

Long DRX 402c; The UE is allowed to turn off its receiver (sleep, or DRX) for all but M out of N sub-frames, where M is a small value, such a 1 or 2, and N is a relatively large value, such as 256.

For correct system operation it is important that both the eNB 102a and the UE 101 are synchronised as to which sub-frames are categorised as DRX (the UE 101 may sleep) and which are not (the UE 101 may not sleep). To enable such co-ordination, inactivity timers may be configured (in both the UE 101 and the eNB 102a). In order to implicitly control (i.e. without signalling commands or orders) transitions towards Connected-Mode DRX sub-states with increased DRX. In addition, MAC commands may also be used by the network (sent from eNB 102a to the UE 101) in order to explicitly direct a transition to an increased DRX sub-state.

When in the connected mode 402, any communication of new user plane data typically results in a transition to the continuous reception sub-state 402a for a period of time determined by the ongoing packet data activity and m inactivity timer known as the DRX-InactivityTimer. Each new data packet resets the DRX-InactivityTimer to a pre-configured value and when the timer expires, a transition from continuous reception 402a to one of the DRX sub-states 402b, 402c is made.

In the LTE system, the mechanisms used to control UE mobility between cells of the network differs between the idle 401 and connected 402 modes:

In idle mode 401, mobility is UE-controlled (i.e. the UE 101 performs cell selection and reselection procedures as per 3GPP Technical Specification 36.304 and in accordance with related configuration parameters set by the network). Following selection or reselection of a new cell by the UE 101, the UE 101 will inform the network of its new location only if the new cell belongs to a tracing area that is different from the tracking area of the previous camped cell. A tracking area is a group of cells—which cells belong to which tracking area is dependent upon network configuration. Thus, in idle mode 401, mobility reports are only seldom sent by the UE 101, and the network is aware of the UE's location with relatively coarse granularity (tracking area level as opposed to cell level).

In connected mode 402, the UE 101 performs measurements of other cells (on the same or other frequencies) according to the configuration sent to the UE 101 by the network in measurement control messages. The measurements are reported by the UE 101 to the network wherein they are used by the network to make handover decisions. Subsequent to a handover decision by the network, the UE 101 is instructed to move to another cell or frequency. Thus, in connected mode 402, measurement reports may be sent relatively frequently and the network is aware of the UE's location with finer granularity (to the cell level).

The RRC and MAC/DRX sub-states for LTE are summarised in Table 1 below.

TABLE 1

| LTE RRC/ MAC State/ sub-state | Radio Access Bearers Established (Uu, S1) | Core Network Bearers Established (S5/S8) | Radio Resources Available | Location Accuracy | Mobility Control | DRX |
|---|---|---|---|---|---|---|
| Connected, Cont. Rx | Yes | Yes | Yes | Cell | Network | No |
| Connected, Short DRX | Yes | Yes | Yes (return to continuous) | Cell | Network | Short sleep |
| Connected, Long DRX | Yes | Yes | Yes (return to continuous) | Cell | Network | Long sleep |
| Idle | No | Yes | No | Tracking Area | UE | Long sleep |

As will be evident from the description below, the present disclosure sets out a method, usable in, for example, an LTE wireless communication network, of suspending an RRC connection such that at least user plane communications between the UE and eNB are disabled (i.e. not able to be transmitted or received by the UE and the eNB), but in which the suspended RRC connection can be efficiently reactivated such that communications between the UE and eNB are resumed across the same 'established' RRC connection, without a new RRC connection having to be created. This provides significant advantages for wireless communications systems for the following reasons.

Some applications running on UEs may generate traffic that requires the provision of transmission resources only infrequently or for short periods of time. Traffic of this nature may be characterised as 'bursty' or 'sporadic' and may involve extended periods of time with little or no data activity. When handling such traffic within the system, frequent RRC state transitions from idle mode 401 to connected mode 402 for the UE 101 would each involve significant signalling exchanges between the UE 101 and the RAN 102, and/or between the RAN 102 and the CN 103. The signalling may for example be needed to:

1. establish or reconfigure Radio Bearers (e.g. over the Uu interface between the UE 101 and the RAN 102)
2. establish or reconfigure other bearers, bearer segments, or communication paths (e.g. the S1 bearer(s) between an LTE eNB 102a,b . . . n and the SGW 103a, or the S5/8 bearer(s) between the SGW 103a and PGW 103c)
3. carry out security procedures to establish secure communications If, for reasons of network efficiency, the UE 101 were kept always in RRC connected mode 402 while handling such traffic, such that repeated state transitions and the related network messaging overhead described above were avoided, this could lead to high power usage and shorter battery life for the UE 101 due to the relatively high power requirements of being always on in RRC connected mode 402. This is partly because in RRC connected mode 402 mobility is always network controlled at the cell level (which involves measurement reporting from the UE). In addition, although DRX cycles (controlled by the MAC layer) may be employed to reduce UE power consumption during times of data inactivity, mobility still remains network controlled and also, the connected-mode DRX configuration is set by the network and may not provide the UE with power consumption comparable to that of idle mode 401. Furthermore, some radio transmission resources may be assigned, reserved or used by the UE for control signalling purposes when in connected mode even though there may be no immediate user-plane data for transmission. The connected mode DRX sub-state may thus exhibit excessive power consumption for the UE 101 or inefficient use of system resources for the RAM 102, whilst a transition to idle mode 401 (and subsequently back to connected mode 402 on resumption of data activity) may incur significant signalling overheads to execute.

As will be evident from the following description, suspending the RRC connection, as set out in the present disclosure, provides advantages over these two techniques of controlling wireless communication systems particularly during so-called 'bursty' or sporadic data transfer to UEs (i.e. repeated state transitions or of holding the UE in a DRX sub-state of connected mode 402), such that, in the present disclosure, network traffic and power consumption can be relatively low and battery life can be relatively high.

In the present disclosure, rather than a UE 101 that is in a connected mode 402 but which is temporarily inactive (i.e. due to no immediate data transfer being needed during an inactive time period of bursty or sporadic communications) transitioning to an idle mode 401 or to a connected mode DRX sub-state 402a, 402b, the UE 101 instead is configured to perform UE controlled mobility (UE autonomous cell selection/reselection) and DRX procedures as if it were in idle mode (the idle mode configuration is reused thereby obviating the need for a new RRC state definition or configuration). However, whilst behaving as if in idle mode, the RRC connection for the UE may be considered to be "suspended" (as opposed to released). The difference between an RRC suspension and an RRC release is that all of the RRC configuration information is not discarded but is instead stored by both the eNB 102*a* and the UE 101. The stored (suspended) RRC configuration may comprise, for example, parameters relating to the current configuration of radio bearers, radio resources, temporary cell identifiers and/or security parameters or keys. Thus one or more (note: not necessarily all-) components of a radio connection "context" still exists in memory within the eNB 102*a* and UE 101, but these may be labelled as 'inactive', 'dormant' or 'suspended'. This may mean that one or more of the stored RRC configuration parameters may not be used for immediate user plane communications between the UE 101 and the eNB 102*a* without executing a step of determining their current validity.

In the proposed solution, should a need for user plane communications arise for a UE with a suspended RRC context, the RRC connection may only be used (by the network or UE as appropriate) following a precursory check as to whether the suspended RRC context is currently valid (corresponding to one or more components of the RRC connection context being stored in memory by the UE 101 and eNB 102*a*). If a valid suspended RRC context does exist, the RRC connection may be freed from suspension (i.e. 'reactivated') and is again ready for immediate use such that user plane communications between the UE 101 and eNB 102*a* may be resumed without the need for extensive RRC reconfiguration, establishment or setup procedures. An "RRC-reactivation" message or procedure is required to resume user plane data transfer (using the previously-stored RRC connection configuration) within the cell, if the pre-existing ('established'), suspended, RRC connection is valid and can be reactivated, no new RRC connection needs to be created in order to continue to handle the user plane communications. This is particularly useful when handling bursty-type data traffic, and can significantly conserve power and keep control plane traffic associated with RRC connection handling low. During the reactivation procedure it is also possible that one or more components of the stored RRC connection are updated.

If a valid suspended RRC context does not exist, or if it is determined that many components of the stored RRC connection would require updating, normal RRC connection establishment procedures are followed as would be the case for a normal idle mode UE (i.e. RRC connection setup following either a random access or paging procedure).

Figure 6:
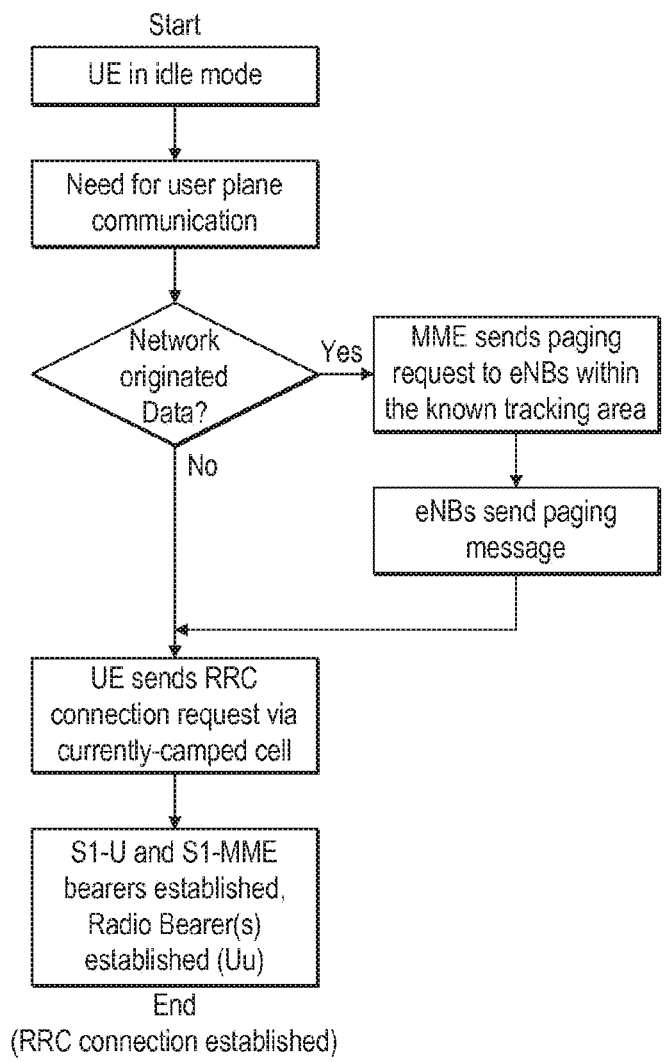
Figure 7:
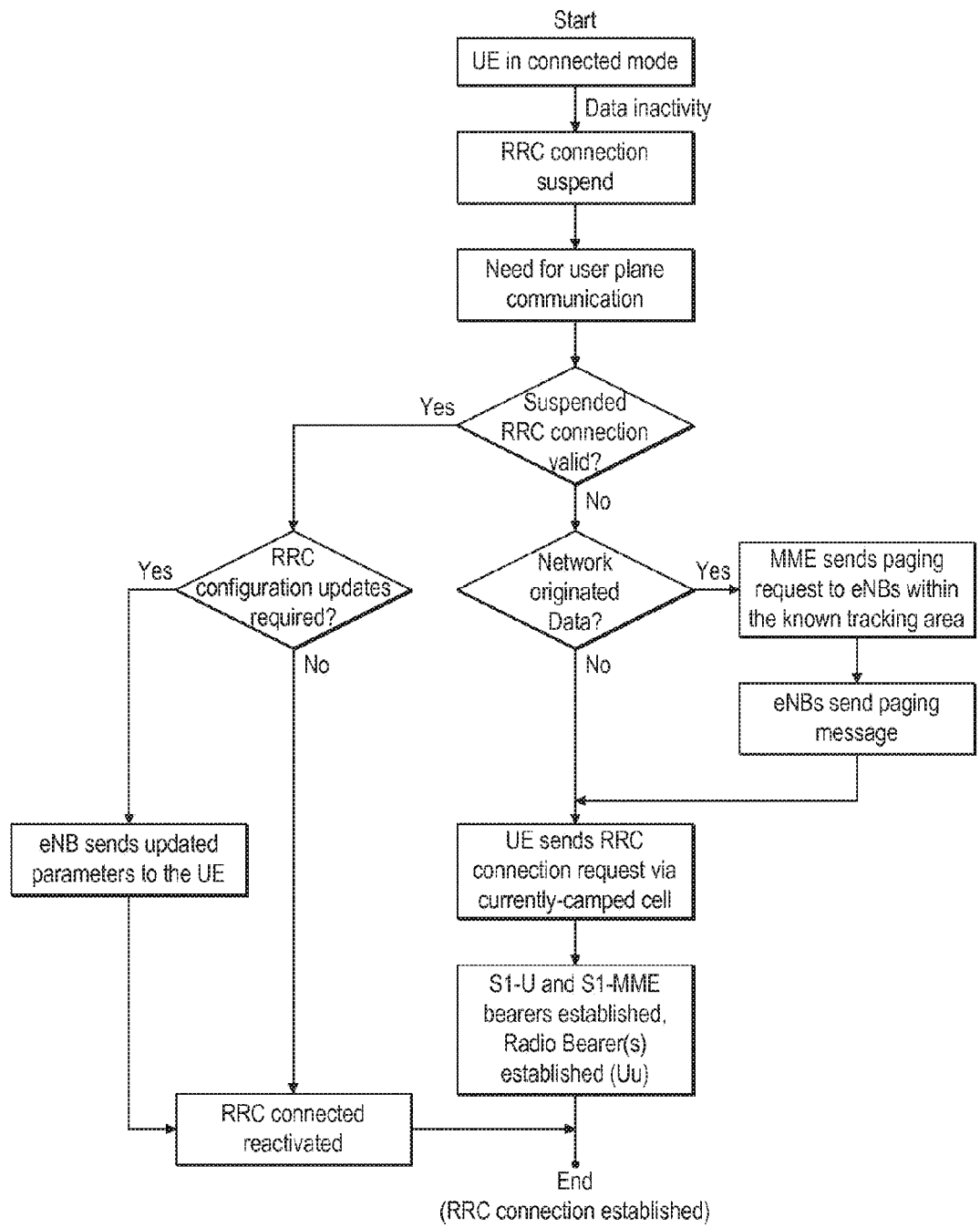
FIG. 7 is a flow diagram illustrating a simplification of the RRC connection reactivation process in a wireless communication system in which RRC connection suspension functionality is provided in accordance with the present disclosure.

A simplified view of this RRC reactivation process is shown in the flow chart of FIG. 7. This may be contrasted to the normal RRC connection setup procedures from idle mode shown in FIG. 6, where no RRC suspension functionality is provided in the wireless communication network. By comparing the flow chart of FIG. 7 with FIG. 6 if can be seen that, in accordance with the present disclosure, subsequent to the suspension of an RRC connection, when a need for user plane data communication arises and it is determined that a suspended RRC connection is 'valid', this can be successfully reactivated by an RRC connection reactivation process. Various RRC connection validity criteria may first be checked in the UE 101 or the eNB 102*a* or in both before the RRC connection reactivation process is triggered. Also due to the fact that a valid S1 interface must also exist prior to communication of user plane data, nodes of the CN 103 (such as the MME 103*b*) may also be involved in checking the validity status of the suspended RRC connection when reactivation is required. Examples of validity criteria that may be employed as inputs to the decision process are listed below:

Whether the UE 101 is currently camped on the same cell as the cell to which it was connected when the RRC context was suspended. Typically, an RRC configuration applies on a per cell basis and so this check can be used to ensure that the context remains valid (i.e. the cell hasn't changed). Note that this does not exclude the possibility for the UE 101 to have moved out of the cell in which the RRC context was suspended, and back in again to the same cell. In these cases the RRC context may still be reactivated and is considered a valid suspended RRC context.

Whether the UE 101 is currently camped on the same group of cells as the group of cells to which it was connected when the RRC context was suspended. An eNB 102*a,b* . . . *n* would typically support multiple cells, allowing for significant co-ordination between those cells at the radio resource management and RRC level without the need for standardised interfaces. Thus a UE's RRC context information may be visible to a group of cells (such as in the same eNB 102*a,b* . . . *n*) and an operator or network vendor may choose to coordinate some aspects of the RRC configuration between them. This could enable an RRC connection that was suspended within one cell under an eNB 102*a* to be resumed under another cell of the same eNB 102*a*. In scenarios such as this, knowledge of whether a UE 101 is still attached to the same eNB 102*a,b* . . . *n* (or other defined group of cells) may be useful when checking whether a suspended RRC connection is still valid at the time it needs to be reactivated. The group of cells may alternatively comprise a tracking area.

Whether an elapsed period of time since the RRC connection was suspended is lower than a predetermined timer expiry threshold. The system may wish to restrict the length of time for which an RRC connection may be retained in the suspended state. Suspended connections with an age beyond a preconfigured value are no longer considered valid.

As described above, in accordance with the present disclosure a UE 101 in a temporarily-inactive connected mode (i.e. having a 'suspended' RRC connection) performs UE-controlled mobility (UE autonomous cell selection/reselection) and DRX procedures as if it were in idle mode, and during this time the RRC connection for this UE may be considered to be "suspended" (as opposed to released). However, the condition of state of the UE during this time may of course be viewed in different ways, for example:

1. The UE 101 may be viewed as being in idle mode (as if performs UE-controlled mobility and idle mode DRX procedures) but with some or all of the configuration associated with its most recent RRC connection remaining stored to allow quick and efficient reactivation of the old RRC connection under certain circumstances.

2. The UE 101 may be viewed as remaining in the RRC connected mode but being configured to perform UE-controlled mobility and DRX procedures similar to idle mode. All or most of the RRC configuration information remains stored in the UE 101 while some parts of the RRC configuration may be released.

3. The UE 101 may be viewed as remaining in the RRC connected mode but being placed in a new state or sub state or mode in which it performs UE-controlled mobility and DRX procedures similar to idle mode. All or most of the RRC configuration information remains stored in the UE 101 while some parts of the RRC configuration may be released.

Indeed, it is not intended that the present disclosure is limited to the UE being considered in the connected mode but with the RRC connection 'suspended'. Rather the present disclosure sets out a methodology of handling RRC connections between a UE and a RAN, and the UE-related connections between the RAN and the CN such that transfer of user plane data between the UE and RAN is disabled and the data representing the RRC connection is stored such that user plane data transfer can later be resumed using the same 'established' RRC connection without that RRC connection being 'released' (i.e. abandoned) and without a new RRC connection needing to be created. This methodology can be utilised not just in wireless communication systems supporting LTE, but also in other wireless communications protocols.

The methods associated with implementing and supporting the RRC Connection suspension and reactivation procedures of the present disclosure will now be described in more detail, including some alternatives and variants that are possible. The procedures associated with RRC Connection suspension and reactivation can be divided into four aspects which are described in the following sections:

RRC Connection Process

Processes Handling mobility (i.e. procedures as the UE moves) during RRC Connection Suspension Processes Handling receipt of downlink (DL) data during RRC connection suspension Processes Handling a suspended RRC Connection to resume Uu data transfer The methods and other modes of operation described herein of the UE 101 eNB 102*a,b* . . . *n*, SGW 103*a*, MME 103*b* and other CN nodes within the scope of the present disclosure may be provided at least in part by one or more processors within the UE 101, eNB 102*a,b* . . . *n*, SGW 103*a*, MME 103*b* and other CN nodes executing machine readable instructions to configure them to function accordingly to carry out said methods. The instructions may be provided as computer software products. Each computer software product may be provided in, on or supported by a computer readable medium which could be provided as all possible permanent and non-permanent forms of computer readable medium either transitory in nature, such as in a data transmission signal for example sent over the internet, or non-transitory m nature such as in a RAM or other, non-volatile storage. On the other hand the computer readable medium may be a non-transitory computer readable medium comprising all computer-readable media, with the sole exception being a transitory, propagating signal.

RRC Connection Suspension Process

In the UE 101, when the RRC Connection suspension occurs the UE 101 may be configured to perform idle mode mobility and paging reception procedures while keeping stored for possible re-use some or all of its RRC context information. In order to maximise the benefits of the RRC Connection suspension procedures, the stored RRC context information should include the following:

The lists of Established Data Radio Bearers (DRBs) and Signalling Radio Bearers (SRBs) including, for each radio bearer, the PDCP configuration and current state (e.g. counter values, etc) and the RLC configuration and status (e.g. counter values, etc).

Security configuration and state (e.g. cipher and integrity algorithm, counter values, etc)

Measurement reporting configuration.

Last used cell identity and cell specific user identity (C-RNTI)

In addition, the stored RRC context may also include other information such as (but not limited to) configuration information or parameters relating to any allocation of radio resources, MAC configuration, physical channel configuration or physical layer configuration data.

Compared to the list above, such information may be more likely to change from one cell to another and hence there may be less benefit in keeping this information stored.

In the network, when the RRC Connection Suspension occurs, the eNB 102*a* ceases to perform connected mode mobility procedures for the UE 101 while keeping stored for possible re-use some or ail of the UE's RRC context information. The RRC context information stored in the network should correspond to that stored in the UE 101. In addition, there are two main alternatives to the network side suspension procedure depending on whether the eNB informs the CN about the suspension at the time it occurs:

RRC Connection Suspension Alternative A—CN not informed of suspension

If the CN 103 is not informed of the suspension (by either the UE 101 or the eNB 102*a*), the S1 user plane between the S-GW 103*a* and the eNB 102*a* will remain active and any inbound network-originated data will be forwarded by the S-GW 103*a* over the S1 to the corresponding eNB 102*a* where it would need to be buffered pending delivery to the UE 101. It is then the responsibility of the eNB 102*a* to contact and deliver the data to the suspended UE 101 if the suspended UE context is found to be invalid at this time (e.g. because the UE has moved to another cell), the eNB 102*a* would need to initiate additional procedures (involving the CN 103) to locate the UE 101 and to route the data to the correct eNB 102*b* . . . *n* and onward to the UE 101 (procedures for contacting the UE 101 in this situation are discussed below). Alternatively, rather than routing data on towards the correct eNB 102*b* . . . *n* once the UE 101 is located, the data may be discarded and higher layer protocols (for example, TCP/IP) may instead be relied upon to ensure eventual delivery.

RRC Connection Suspension Alternative B—CN informed of suspension

If the CN 103 is informed of the suspension (e.g. by either the UE 101 or the eNB 102*a*), it may take action to also suspend the S1 user plane between the S-GW 103*a* and the eNB 102*a*. The S1 user plane suspension may only affect the way that the S-GW 103*a* treats DL user data arriving in the S-GW 103*a*. Hence, in this case it may be considered as just a DL S1 user plane suspension such that any inbound network-originated data is buffered at the S-GW 103*a* pending delivery to the UE 101. It is then the responsibility of the CN 103 (i.e. MME 103*b* and/or S-GW 103*a*) to identify the location of the UE and to subsequently contact and deliver the data to the suspended UE 101.

The CN 103 would typically be notified of a suspension through receipt of a notification message from the eNB 102*a*, it is also possible that the UE 101 could inform the CN 103 of a connection suspension (e.g. following its receipt of a suspend message from the eNB 102*a*), although this may be less preferable due to the fact that this would involve additional signalling over the air interface.

A CN node (e.g. MME 103*b* and/or S-GW 103*a*) may maintain a validity indicator for each UE (effectively this may relate either to whether an active S1 user plane exists for the UE, or to the current, validity status of a suspended S1 user plane for the UE). As mentioned in section 5, this indicator may be set based upon one or more separate sub-criteria such as location-based criteria or timer-based criteria. The location-based validity criteria may involve for example recording a cell or eNB 102a,b . . . n from which the RRC suspend notification was initially received and setting the location validity indicator to TRUE if the currently-known location of the UE 101 matches the validity criteria, and setting the location validity indicator to FALSE otherwise. The timer-based validity criteria may involve setting a timer-based validity indicator to TRUE if an elapsed time since the RRC connection suspension (or S1 connection suspension) is lower than a threshold value and to FALSE, otherwise. By means of example, the overall validity criteria may comprise setting an overall validity indicator to TRUE if both the location validity indicator and the timer-based validity indicator are TRUE, and setting the overall validity indicator to FALSE otherwise.

Figure 8:
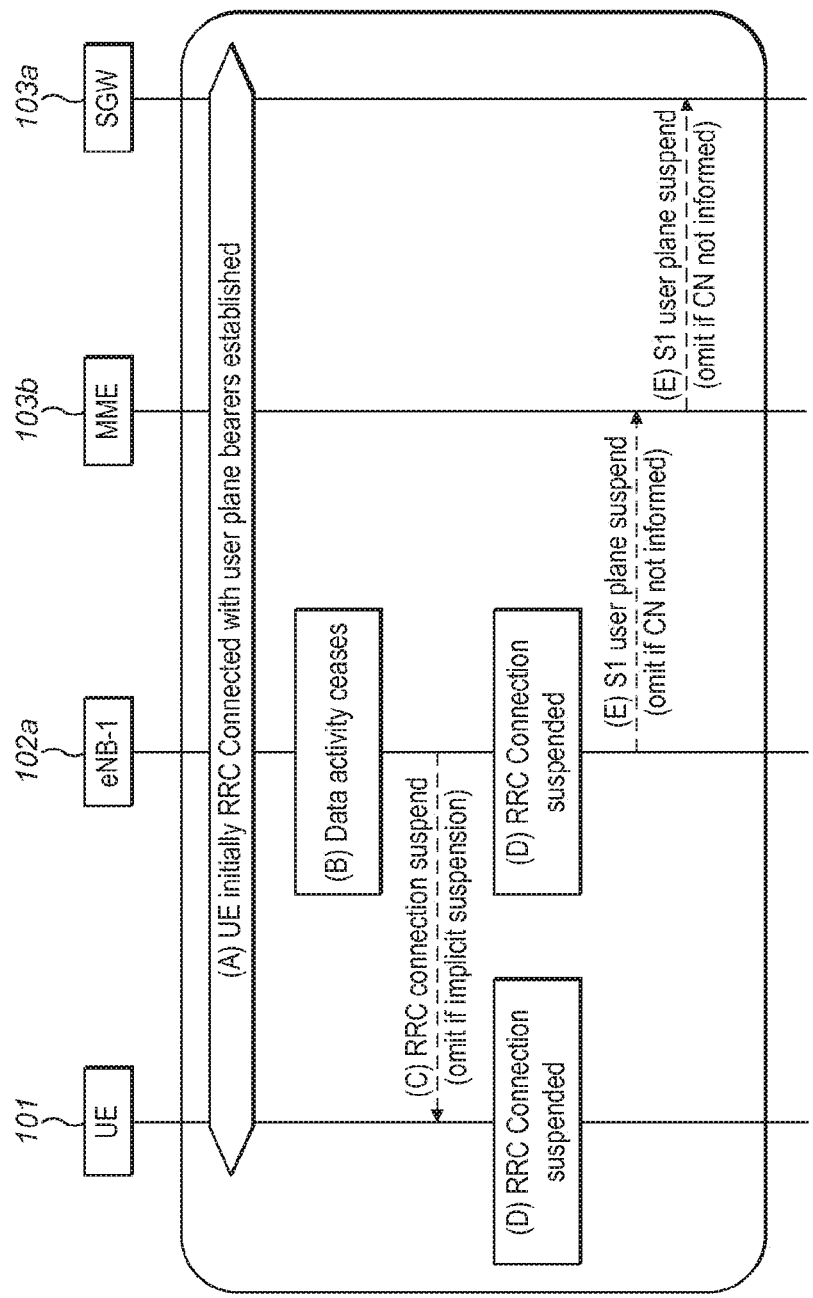
FIG. 8 is a flow diagram illustrating a simplification of the RRC connection process in a wireless communication system in which no RRC connection suspension functionality is provided.

An example message sequence chart of events related to an RRC Connection suspension is shown in FIG. 8. Steps E-G of the process described below (but not all shown in FIG. 8) are only carried out if the CN 103 is informed of the suspension (otherwise these steps are omitted). The steps of the RRC connection suspension process shown in FIG. 8 can be described as follows:

A. A UE 101 is in connected mode.
B. Data activity for the UE 101 ceases temporarily (e.g. due to 'bursty' communications by an application running on UE 101).
C. The UE's RRC Connection is suspended. This may be achieved via implicit mechanisms such as the expiry of an inactivity timer in both the eNB 102a and the UE 101, or via explicit mechanisms such as the sending of a message or command from the eNB 102a to the UE 101 to instruct the suspension of the RRC Connection. In the explicit case, the suspend message may be sent by the eNB 102a in response to a network inactivity timer expiry, or as the result of other events such as the receipt of an indication from the UE that it expects no more data to send. In the implicit case, the eNB 102a and UE 101 enter the suspend state at approximately the same time but no suspend message need be sent.
D. The UE 101 and eNB 102a suspend the RRC connection. The Uu connection is effectively 'deactivated' such that no user plane data is transferred between the eNB 102a and UE 101 but RRC configuration information is stored by both the UE 101 and the eNB 102a. The UE 101, however, continues to monitor for paging or notification of downlink data (see below).
E. The eNB 102a may optionally send an S1 user-plane suspend message to the MME 103b and/or SGW 103a (possibly via the MME) to inform the CN 103 of the RRC suspension. The message may include fields to identify the one or more UEs and possibly bearer identifiers that have been suspended.
F. The MME 103b may deactivate (but store in memory) the existing S1-MMS (S1c) bearer context associated with the UE 101. 'Deactivating' is understood here to mean that data ceases to be transferred over the bearer.
G. The SGW 103a deactivates (but stores in memory) existing S1-u user plane bearer contexts associated with the UE. Again, 'deactivating' is understood here to mean that data ceases to be transferred over the bearer.

Specific actions taken by the CM 103 in response to receipt of an S1 suspend may therefore include:

Deactivating (but storing, pending reactivation) one or more S1 user plane and/or S1-MME bearer contexts in the SGW 103a and MME 103b respectively, or in eNB 102a Buffering of any network-originated user data at the SGW 103a pending resumption of the S1 user plane Monitoring for inbound tracking area or other location/cell updates at the MME 103b from the UE who's RRC connection has been suspended (in order to assist with determining validity status in the event of a need for reactivation)

In order for the RRC Connection suspend process above to be used, both the UE 101 and the network of the wireless communication system need to be configured to support this functionality. An RRC Connection suspension support indicator may be included a UE capabilities message that is transferred from the UE 101 to the network. Alternatively, support for RRC connection suspension in the UE may be implicitly inferred by the eNB as the result of the UE indicating support for another (but associated) feature or UE capability within the UE capability message. If the UE capability message indicates that the UE supports the RRC Connection suspend functionality then the eNB 102a can choose to configure the UE 101 with appropriate parameters to trigger implicit suspension (e.g. via configuration of a suspension timer value) or the eNB 102a can choose to send the explicit RRC Connection suspend message, eNB 102a may also choose to configure the UE 101 such that RRC suspension procedures or components of the RRC suspension behaviours are either allowed or disallowed.

Processes Handing Mobility During RRC Connection Suspension

On suspension of a UE's RRC connection, the UE 101 performs cell selection and reselection in a similar manner to that of a normal idle mode UE 101 (i.e. the UE 101 follows the general mobility procedures of TS 36.304). However, if location-based validity criteria are used, then the UE 101 can be aware when the UE 101 selects/reselects a cell in which its suspended RRC Connection is not valid (e.g. a cell where the eNB 102b . . . n controlling that cell does not have the stored context information for that UE).

Figure 9:
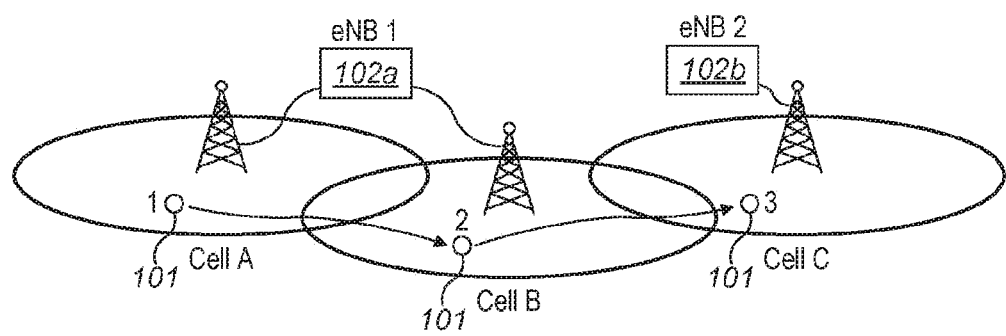
FIG. 9 is an illustration of an exemplary mobility scenario for handling by the mobility handling process signalling variants during RRC connection suspension in accordance with the present disclosure.

An example is shown in FIG. 9 where the UE 101 is initially on Cell A under eNB1 102a (point 1). The RRC Connection is suspended. The UE 101 reselects from Cell A, under eNB1 102a, to Cell B, also under eNB1 102a (point 2). From the location based validity criteria, the UE 101 knows that its suspended RRC Connection is still valid and hence need take no action. The UE 101 then reselects from Cell B to Cell C which is under a different eNB, i.e. eNB2 102b (point 3). From the location based validity criteria, the UE 101 knows that its suspended RRC Connection is no longer valid at point 3. At this point, there are two main alternative mobility handling process for how the UE 101 acts during RRC connection suspension. The UE 101 may be configured to only perform one of the following methods, or selectively perform either method.

Mobility Alternative A—Do not inform the network that the UE is outside of the area where its Suspended RRC Connection is valid Although at point 3 the UE 101 is aware that it is outside the area where it knows its suspended RRC Connection is valid, the UE 101 does not initiate any signalling towards the network. Instead, the UE 101 continues to perform UE-based mobility and paging reception procedures and continues to keep its stored RRC Context Information. In mobility alternative A, as long as the UE 101 remains Within a registered tracking area (TA) of cells then cell reselections do not trigger any signalling towards the network (i.e. the network is not made aware of the reselections). However, the UE 101 would still need to perform a Tracking Area Update (TAU) if it moved outside of its registered TA(s), just as it would have to do if it were in idle mode. A TA would typically cover many cells and many eNBs 102a, b, . . . n. The RRC Context information remains stored so that it can potentially be used if, at the time that data activity is resumed, the UE 101 has returned to a cell where the suspended RRC Connection is valid.

Mobility Alternative B—Inform the network that the UE is outside the area where its Suspended RRC Connection is valid When, at point 3, the UE 101 is aware that it is outside the area where it knows its suspended RRC Connection is valid, the UE 101 in this alternative initiates some signalling to inform the network. Under mobility alternative B, the signalling procedures adopted by the UE 101 can, for example, be one of the following three variants:

Signalling Variant 1—Discard suspended RRC connection, perform NAS procedure and return to idle.
  On the new cell under eNB2 102b, in this variant the UE 101 discards its suspended RRC connection and performs signalling by initiating a Non Access Stratum (NAS) procedure (e.g. an LTE 'TAU' procedure). This may be an unmodified TAU procedure or may be a TAU procedure modified to include a cause value indicating the reason for sending the TAU (i.e. the UE has identified that the suspended RRC connection is no longer valid). This TAU procedure causes the MME 103b to release the S1 connection to eNB1 102a and the eNB1 102a to release the suspended RRC Connection. At completion of the TAU procedure the UE 101 is placed into idle mode and hence has no RRC Connection with any eNB 102a,b . . . n.

Signalling Variant 2—Discard suspended RRC connection, perform NAS procedure and remain RRC connected.
  On the new cell under eNB2 102b, in this variant the UE 101 discards its suspended RRC connection and performs signalling by initiating a NAS procedure (e.g. TAU or Service Request). This may be an unmodified TAU or Service Request or may be a modified TAU or service request modified to include a cause value indicating the reason for initiating the procedure (i.e. the UE has identified that the suspended RRC connection is no longer valid). This TAU/Service Request causes the MME 103b to release the S1 connection to eNB1 102a and causes eNB1 102a to release the suspended RRC Connection. The MME 103b initiates new access stratum security and establishment of data radio bearers (DRBs) and establishment of an S1 user plane connection to eNB2 102b. At completion of the TAU/Service Request, the UE 101 remains in RRC Connected with eNB2 102b. The eNB2 102b may choose to suspend the RRC Connection as described above, such that the new RRC connection between the UE 101 and eNB2 102b is suspended. If so, the state of the UE 101 at point 3 in FIG. 9 would then be the same as it was at point 1 but with an RRC Connection with eNB2 102b instead of eNB1 102a.

Signalling Variant 3—Maintain suspended RRC connection, perform signalling to inform CN of mobility
  On the new cell under eNB2 102b, in this variant the UE 101 maintains its suspended RRC context and performs signalling by initiating a procedure in order to inform the CN 103 that the UE 101 has a currently-invalid suspended RRC Connection. This procedure could be a NAS procedure—for example, k could be an unmodified TAU or a TAU containing a new indication that the UE 101 has an invalid suspended RRC Connection, or it could be a new NAS message such as "NAS Mobility Update" message. Alternatively, this could be an access stratum (AS) procedure that in turn triggers the eNB2 102b to inform the CN 103 that the UE 101 has a suspended-but-currently-invalid RRC connection—for example it could be an new "RRC Mobility Update" message sent from UE to eNB2 102b, or it could be an existing RRC message containing a new "Mobility Update Indicator", then followed by an "S1 Mobility Update" message from eNB2 102b to MME 103b. Whatever form the signalling takes the purpose of the procedure is that it will cause the S-GW 103a to suspend the S1 user plane. At completion of the procedure the UE 101 remains with its suspended RRC connection but is camped on eNB1 102a. Note that in order to perform the TAU procedure the UE may or may not have had to create an RRC Connection with eNB2 102b and an S1 connection with the MME 103b. If such connections do need to be created, this may be considered as a temporary RRC Connection that gets discarded at the completion of the TAU or other update message. If the MME 103b were to establish access stratum security and establish DRBs then this temporary RRC Connection would become the 'permanent' RRC Connection and the suspended RRC Connection would be discarded.

Figure 10:
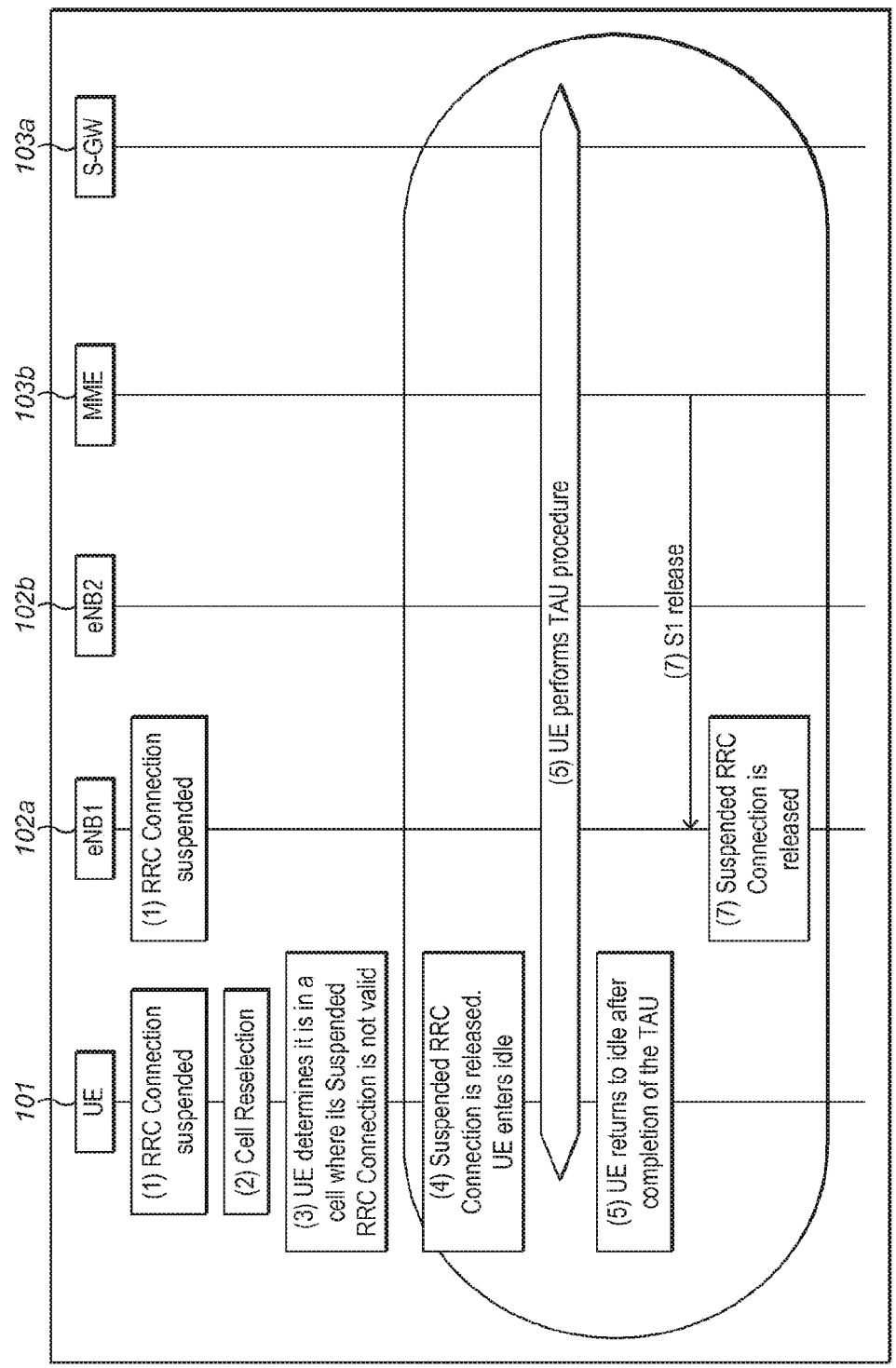
FIG. 10 is a message sequence chart illustrating an example of signalling variant 1 in mobility processing alternative B in a wireless communication system in which a UE has a suspended RRC connection.
Figure 11:
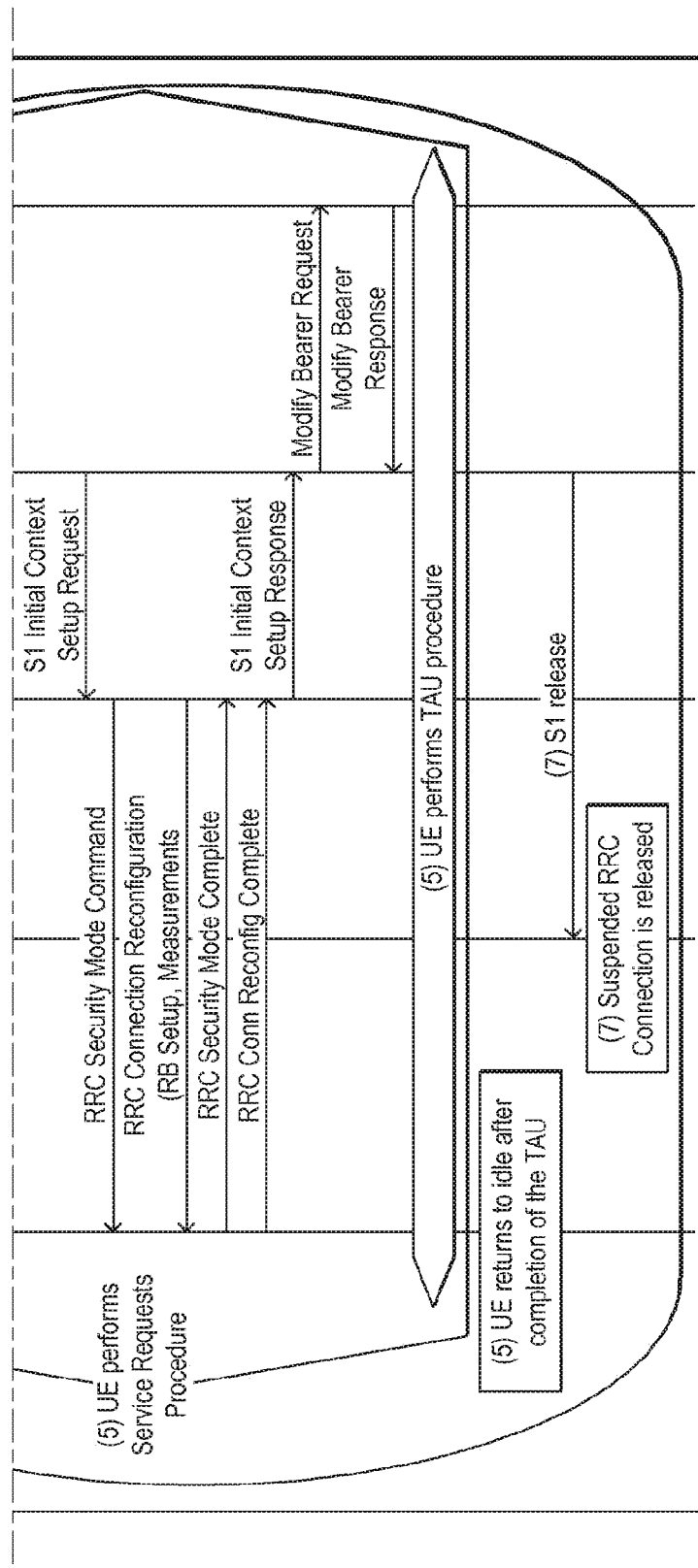
FIG. 11 is a message sequence chart illustrating an example of signalling variant 2 in mobility processing alternative B in a wireless communication system in which a UE has a suspended RRC connection.
Figure 12:
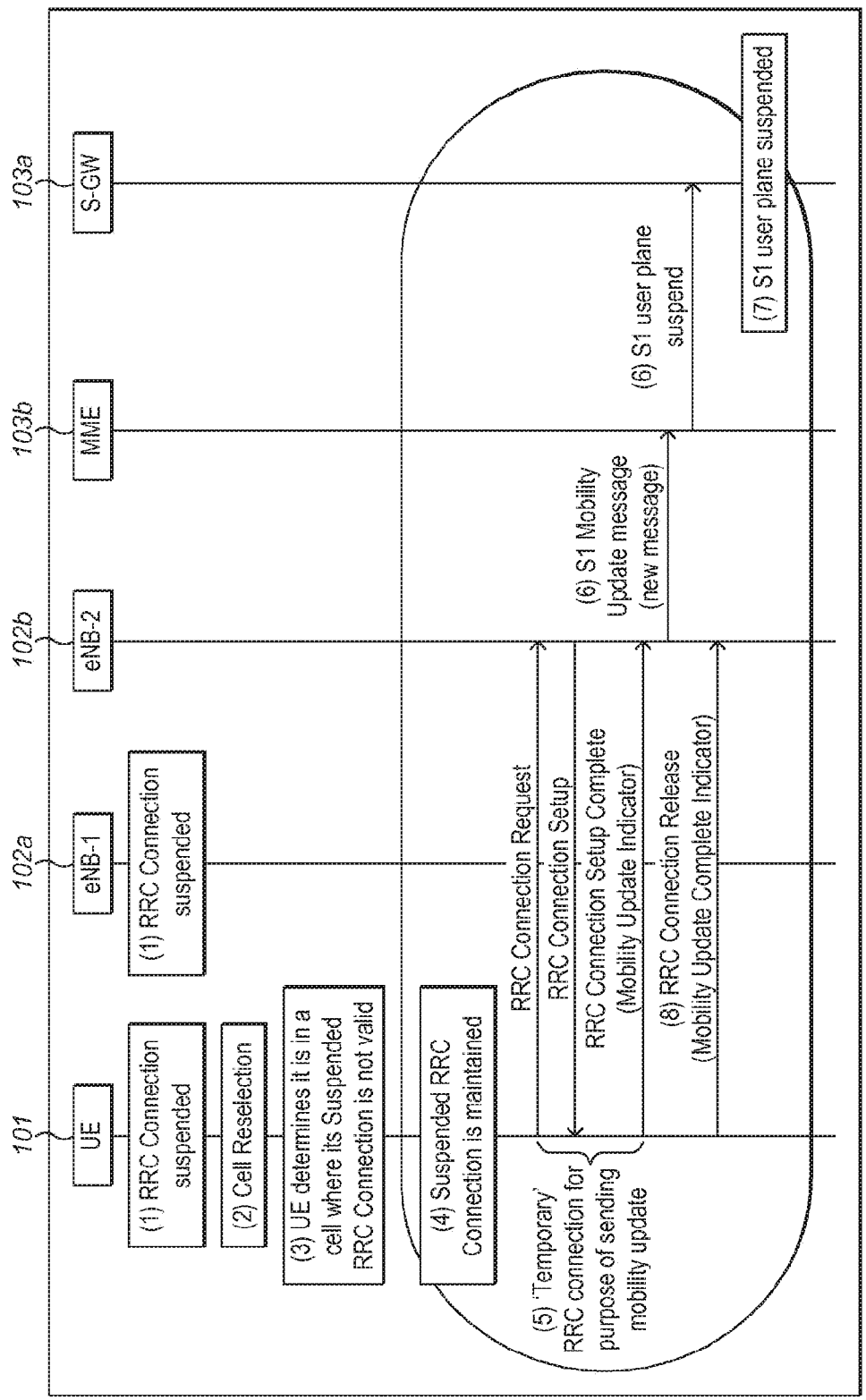
FIG. 12 is a message sequence chart illustrating an example of signalling variant 3 in mobility processing alternative B in a wireless communication system in which a UE has s suspended RRC connection.

Message sequence charts for the above three signalling variants (1, 2, 3) are shown in FIG. 10, FIG. 11 and FIG. 12 respectively. The initial steps of these charts are the same with the differences between the three variants occurring within the areas identified by rectangles having rounded ends.

Signalling variant 1, shown in FIG. 10, can be described as follows.

1. The UE 101 initially has a suspended RRC Connection with eNB1 102a.
2. UE 101 performs cell reselection to a cell under the control of eNB2 102b
3. Following cell reselection the UE 101 determines that it is now in a cell where its suspended RRC Connection may not be valid.
4. The UE 101 releases its suspended RRC Connection for eNB1 102a. UE 101 enters idle mode.
5. The UE 101 initiates a TAU. To perform the TAU the UE 101 first establishes an RRC Connection with eNB2 102b and then sends the Tracking Area Update Request. The MME 103b responds with a Tracking Area Update Accept.
6. Following the completion of the TAU procedure, the UE 101 returns back to idle mode.
7. The MME 103b also sends an S1 release command to eNB1 102a to inform it that it can releases its suspended RRC Connection for the UE 101 and/or release any active or suspended S1 connections for the UE 101.

Signalling variant 2, shown in FIG. 11, can be described as follows.
1. The UE 101 initially has a suspended RRC Connection with eNB1 102a.
2. UE 101 performs cell reselection to a cell under the control of eNB2 102b.
3. Following the cell reselection, the UE 101 determines that it is now in a cell where its suspended RRC Connection may not be valid;
4. The UE 101 releases its suspended RRC Connection for eNB1 102a. UE 101 enters idle mode.
5. The UE 101 initiates a TAU of Service Request procedure. To perform the TAU or Service Request procedure the UE 101 first establishes an RRC Connection with eNB2 102b and then sends the Tracking Area Update Request or Service Request. The MME 103b responds by triggering the establishment of access stratum security and the establishment of the DRBs and the S1 user plane with eNB2 102b. The figure shows the Service Request procedure although the TAU procedure would be quite similar. Note the figure does not label the individual messages that make up the overall procedure.
6. Following the completion of the TAU or Service Request procedure, the UE remains in RRC Connected with eNB2 102b.
7. The MME 103b also sends an S1 release command to eNB1 102a to inform it that it can release its suspended RRC Connection for the UE 101 and/or release any active or suspended S1 connections for the UE 101.

Signalling variant 3, shown in FIG. 12, can be described as follows.
1. The UE 101 initially has a suspended RRC Connection with eNB1 102a.
2. UE 101 performs cell reselection to a cell under the control of eNB2 102b.
3. Following the cell reselection, the UE 101 determines that it is now in a cell where its suspended RRC Connection may not be valid.
4. The UE 101 maintains, its suspended RRC Connection for eNB1 102a.
5. The UE 101 initiates signalling to inform the CN 103 that the UE 101 has a suspended RRC Connection but has moved outside the area where its suspended RRC Connection is known to be valid. The example in FIG. 12 shows the UE 101 establishing a 'temporary' RRC Connection and in the RRC Connection Setup Complete message the UE 101 includes a 'Mobility Update Indicator' although other alternatives are possible including the use of a TAU procedure (in which case signalling variant 3 is similar to signalling variant 1 with the exception that the suspended RRC connection is maintained following the UEs reselection to a cell under control of eNB2 102b and is not released—i.e. the procedure is as per signalling variant 1 but without execution of steps 4, 6 and 7).
6. From reception of the Mobility Update Indicator the eNB2 1020 is aware of the purpose of this RRC Connection Establishment and sends an S1 Mobility Update message to the MME 103b. In response to this the MME 103b sends an S1 user plane suspend message to the S-GW 103a.
7. On receipt of the S1 user plane suspend message the S-GW 103a knows that DL data for this UE 101 should be buffered, and the UE 101 located before the data can be delivered (i.e. the S-GW 103a should not simply forward the DL data over the S1 to eNB1 102a as there is a possibility that the UE 101 will not be located under eNB1 102a).
8. eNB2 102b instructs the UE 101 to release the 'temporary' RRC Connection. The UE 101 still maintains its suspended RRC connection for eNB1 102a but is camped on a cell under eNB2 102b.

A consequence of both signalling variants 1 and 2 is that the UE 101 releases the suspended RRC Connection and initiates a signalling procedure as soon as it moves out of the area where the suspended RRC Connection is known to be valid. Whenever data activity resumes, it will be necessary for a new RRC Connection (and Security and DRBs) to be established before data transfer can begin. Therefore signalling variants 1 and 2 may not be very effective at reducing signalling load if the UE is moving.

A benefit of signalling variant 3 compared to variants 1 and 2 is further explained by reference to FIG. 13, which shows a mobility scenario similar to that shown in FIG. 9, in which a UE 101 with a suspended RRC connection moves out of its cell to a point 3 in another cell in which the RRC connection is invalid, but the FIG. 13 scenario additionally shows the UE 101 moving to points 4 and 5. As explained above, with signalling variant 3 at point 3 the UE 101 has a suspended RRC Connection associated with eNB1 102a and has signalled to the network that it has moved to out of the area where it knows its suspended RRC Connection is valid. The S-GW 103a has suspended the S1 user-plane to eNB1 102a.

Figure 13:
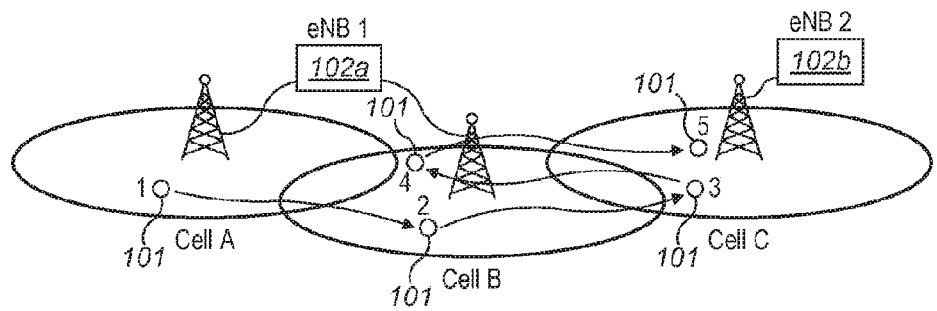
FIG. 13 is an illustration of another exemplary similar to FIG. 9 in which the UE moves back into, and again out of, a cell of the RAN in which the suspended RRC connection is valid.

In the FIG. 13 mobility scenario, after moving to point 4 the UE 101 reselects back to cell B which is under the control of eNB1 102a. No signalling needs to be initiated towards the network. If data activity were to resume at this point, then the suspended RRC Connection with eNB1 102a could be reactivated. Similarly, the S1 connection between SGW 103a and eNB1 102a could also be reactivated if it had been previously suspended.

In the FIG. 13 mobility scenario, after moving to point 5 whilst the RRC connection with eNB1 102a remains suspended, the UE 101 reselects back to cell C which is under the control of eNB2 102b. Although the UE 101 is again moving outside the area where it knows its suspended RRC Connection is valid, there is no need to initiate any signalling. This is because the S1 user plane connection between SGW 103a and eNB1 102a has already been suspended at the S-GW 103a (this having occurred on the transition from point 2 to point 3). If data activity were to resume at this point, then the suspended RRC Connection with eNB1 102a would be released and a new RRC Connection would need to be established with eNB2 102b.

It can be seen that with signalling variant 3, signalling towards the network is only required the first time that the UE 101 moves out of the area where it knows that its suspended RRC Connection is valid, and whilst the RRC connection remains suspended, subsequent moves in and out of the area can be performed without any signalling. Hence, this approach is effective at reducing signalling that may otherwise be associated with a UE 101 that is located close to a boundary of 2 cells where 'ping-pong' reselections between the cells could occur.

As an extension to sign ailing variant 3, the UE could be configured to additionally perform signalling towards a RAN or CN node whenever it moves back in to a cell or group of cells for which the suspended RRC connection is again valid (e.g. a cell under the control of eNB1 102a). This could enable a suspended S1 connection between SGW 103a and eNB1 102a to be reactivated. The benefits in doing so may be marginal however and hence the normal signalling variant 3 may be the preferred option.

The above procedures may be supplemented with timer based expiry of a suspended RRC connection. For example, a timer may be started at the time of suspension, or at the time of leaving a suspension cell (or group of cells). When the timer expires, the UE 101 (and eNB 102*a,b* . . . *n* and CN 103 nodes) discard any UE 101 context information and the UE 101 returns to normal idle operation. If common timers are used within both the UE 101 and the eNB 102*a,b* . . . *n* or CN 103 nodes) this may take place without any signalling between the UE 101 and the any of the RAN or CN nodes. If the timers are implemented only at the eNB 102*a,b* . . . *n* or CN 103 node side, signalling may be required for the RAN or CN nodes to inform the UE that the suspended RRC connection is being released and to instruct a return to idle.

Some possibilities within the signalling variants rely on the use of existing procedures (NAS Service Request and TAU) and hence the UE 101 can assume that these are supported by the network. However, other possibilities within the signalling variants rely ors new signalling functionality. In such cases, it may be necessary for the UE 101 to know that the eNB2 102*b* supports the new signalling before it initiates that signalling towards the eNB2 102*b*. To address this eNB2 102*b* may broadcast a support indicator in system information. This could be a general indicator to indicate support for all the RRC Connection suspension functionality or it could just indicate support for the new signalling functionality (such as the Mobility Update signalling option described in FIG. 12 for signaling variant 3). If the UE 101 sees that the eNB2 102*b* does not support the functionality then the UE 101 can fall back to behaving in line with signalling variants that do not require new signalling functionality (e.g. the UE could release its suspended RRC connection and then initiate a TAU or Service Request procedure).

In the present disclosure, "releasing an RRC connection" may mean simply ignoring the stored RRC context data, or indicating or marking that data as being released or invalid, or scrubbing that data, or deleting the data from memory. Other methods that achieve the same functional effect of releasing an RRC connection are also intended to be within the scope of the present disclosure.

Handling Receipt of Downlink (DL) Data During RRC Connection Suspension

On suspension of a UE's RRC connection, the UE 101 performs cell selection and reselection in a similar manner to that, of a normal idle mode UE 101 (i.e. the UE 101 follows the general mobility procedures of 3GPP TS 36.304). In addition, the UE 101 may monitor the paging channel in exactly the same way as it does in idle mode; i.e. the UE 101 will power on its receiver at the appropriate paging occasions to attempt to receive a paging message and then check that paging message for the UE's identity (e.g. S-TMSI). On reception of a paging message containing the UE's identity, the UE 101 will attempt to resume its suspended RRC Connection as described below.

When DL data arrives in the network for a UE 101 that has a suspended RRC Connection, it is necessary that the network can contact or page the UE 101 irrespective of which cell the UE 101 may now be located in. Depending on whether RRC Connection Suspension alternative A or B (described above) is used, and whether Mobility alternative A or B (also described above) is used, then different scenarios for paging the UE 101 when DL data arrives at the S-GW 103*a* are possible. Three scenarios for handling DL data in the network will thus now be described with reference to FIGS. 14 to 16.

Figure 14:
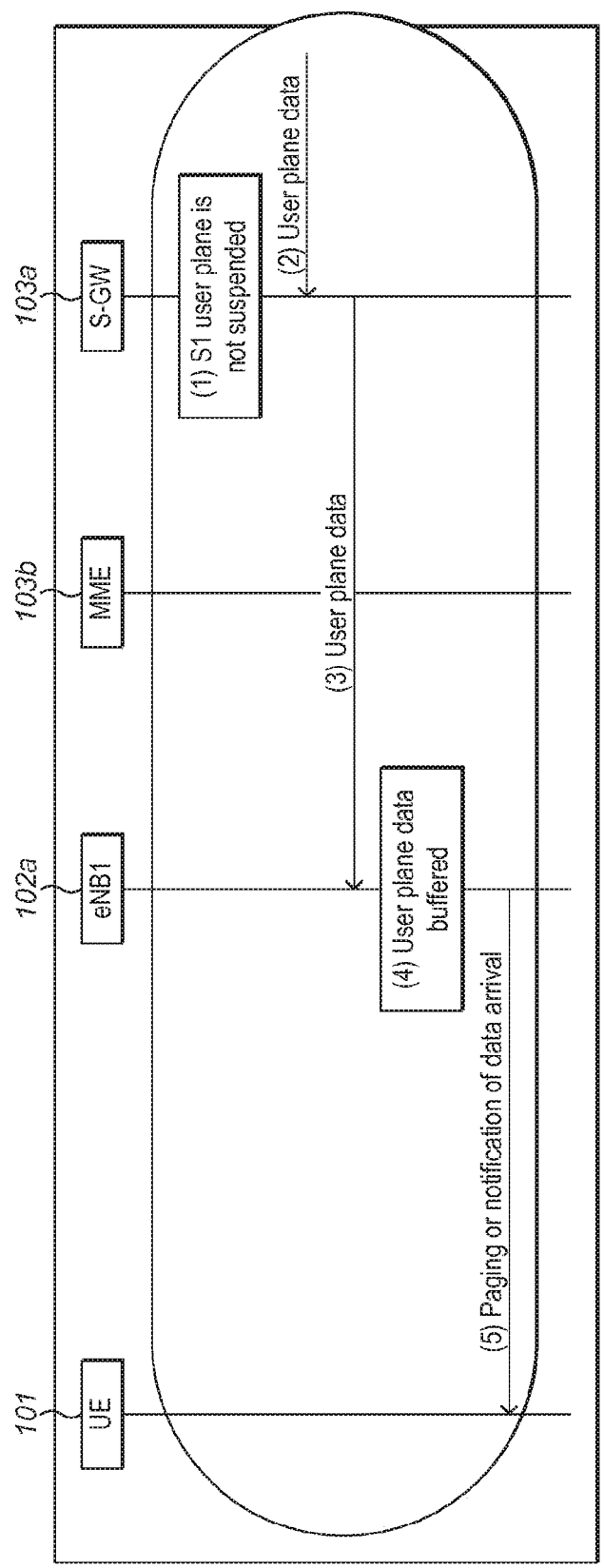
FIGS. 14, 15 and 16 are message sequence charts illustrating methods for handling downlink (DL) data in the network in different scenarios when the RRC Connection between a UE and a RAN are suspended.

FIG. 14 shows a message sequence chart representing a method of handling DL data in the network when the UE 101 has a suspended RRC Connection with eNB1 102*a*. The UE 101 is currently located on a cell under eNB1 102*a* and the S1 user plane between SGW 103*a* and eNB1 102*a* is not suspended (1). When DL data arrives at the S-GW 103*a* (2), the S-GW 103*a* forwards the user plane data directly to eNB1 102*a* (3). This is normal S-GW 103*a* behaviour for a UE 101 in RRC Connected state, eNB1 102*a* buffers the DL data (4) and then sends a paging message or notification of data arrival message to the UE 101 (5). When the UE 101 responds to the paging/notification, (e.g. via the sending of an RRC re-activation request) the suspended RRC Connection may be reactivated and then the eNB1 102*a* will be able to deliver the DL data.

Figure 15:
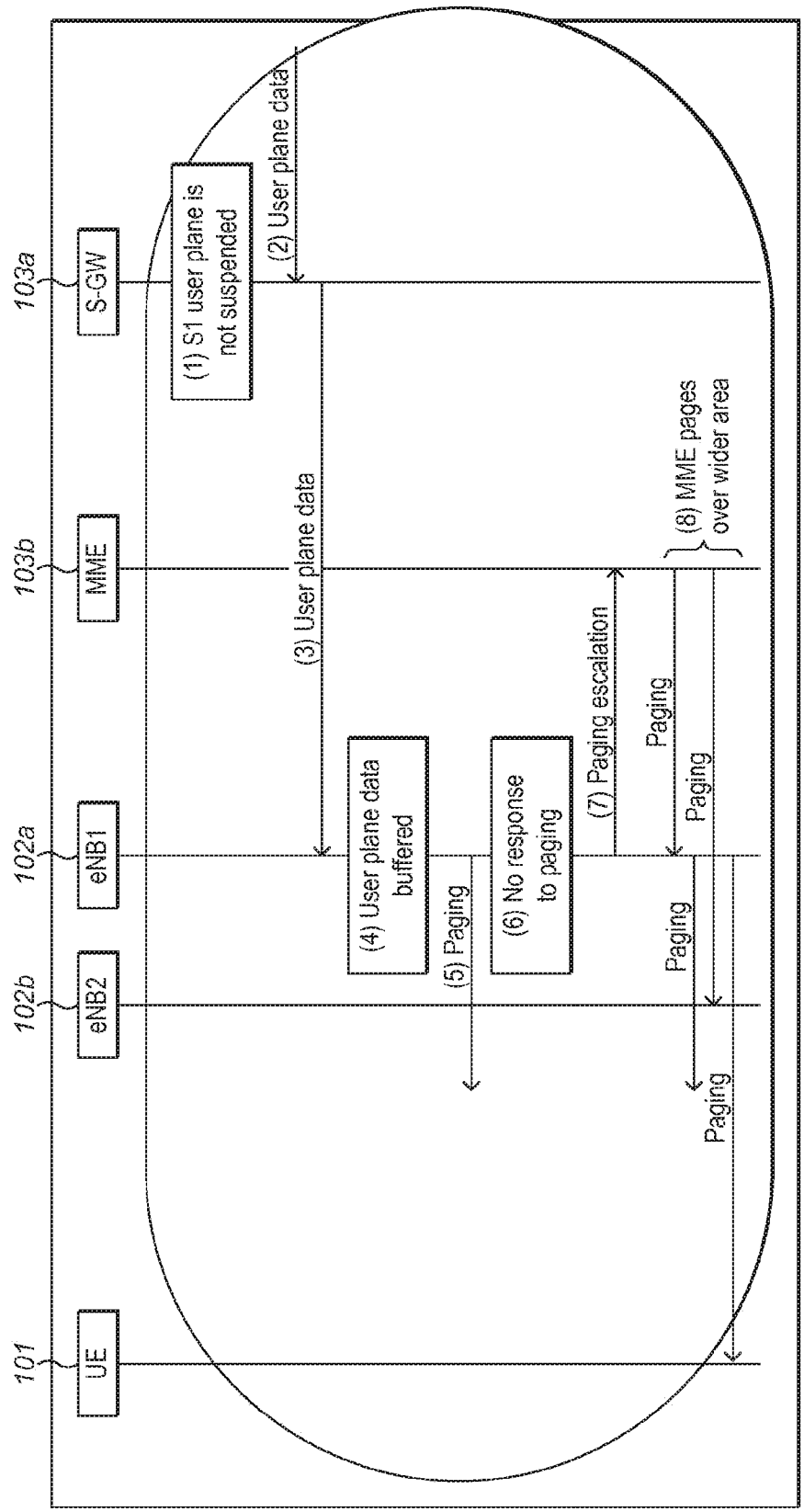

FIG. 15 shows a message sequence chart representing a method of handling DL data in the network when the LTE 101 has a suspended RRC Connection with eNB1 102*a*. The UE is currently located on a cell under a different eNB (i.e. eNB2 102*b*) and the S1 user plane between SGW 103*a* and sNB1 102*a* is not suspended (1). When DL data arrives at the S-GW 103*a* (2), the S-GW 103*a* forwards the user plane data directly to eNB1 102*a* (3). This is normal S-GW 103*a* behaviour for a UE 101 in RRC Connected. The S-GW 103*a* is not aware that the UE 101 has moved or may have moved away from eNB1 102*a* and hence the S-GW 103*a* is not able to take any alternative action. eNB1 102*a* buffers the DL data (4) and then sends a paging message or notification of data arrival message to the UE 101 (5). As the UE 101 is no longer located in a cell under eNB1 then no response (in the form of an attempt by the UE to reactivate the suspended RRC Connection) is received (6). eNB1 102*a* send a "paging escalation" message to the MME 103*b* (7) in order to request the MME 103*b* to page the UE 101 over a wider group of cells (8) (for example the MME 103*b* could page the UE 101 in all the cells of the tracking area(s) (TA(s)) in which the UE 101 is registered).

Figure 16:
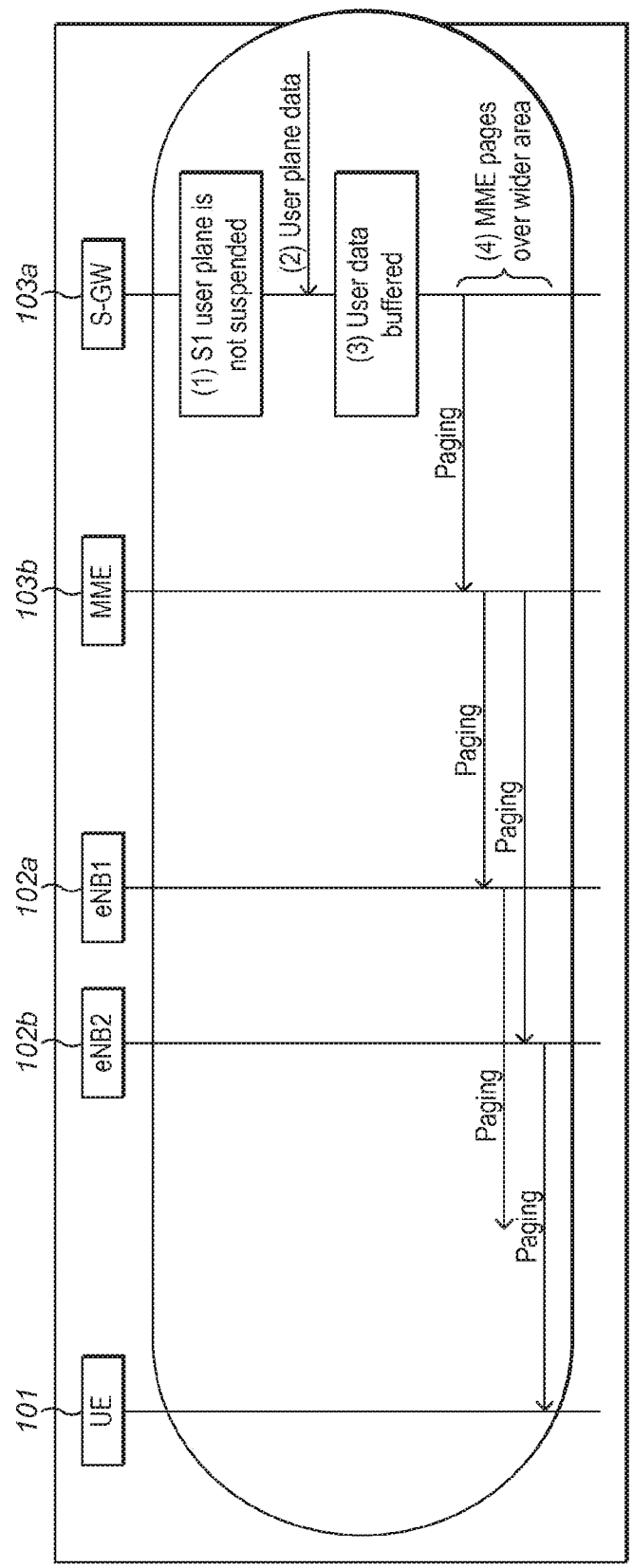

FIG. 16 shows a message sequence chart representing a method of handling DL data in the network when the UE 101 has a suspended RRC Connection with eNB1 102*a* and the S1 user plane connection between SGW 103*a* and eNB1 102*a* is suspended (1). Note that the S1 user plane suspension may have occurred as a result of RRC Connection suspension alternative B or as a result of Mobility alternative B with signalling variant 3. The UE 101 may be located in a cell under eNB1 102*a* (i.e. the eNB where the RRC Connection was suspended) or it may be located under a cell of a different eNB 102*b*, . . . *n*. When DL data arrives at the S-GW 103*a* (2), the S-GW 103*a* buffers this user plane date (3). The S-GW 103*a* then initiates a paging procedure towards the MME 103*b* to request the MME 103*b* to page the UE 101 (4) MME 103*b* then pages the UE 101 over a wider group of cells, for example it could page the UE 101 in all the cells of the TA(s) in which the UE 101 is registered.

Handling a Suspended RRC Connection to Resume Uu Data Transfer

RRC Connection Reactivation can be triggered by UL data being generated in the UE101, or by the reception of a paging or DL data notification message indicating that the network has DL data waiting to be delivered. When this occurs the UE 101 first determines whether its suspended RRC Connection is valid for the cell in which it is currently located. Depending on whether the suspended RRC Connection is determined to be valid, a number of different options are possible.

Figure 17:
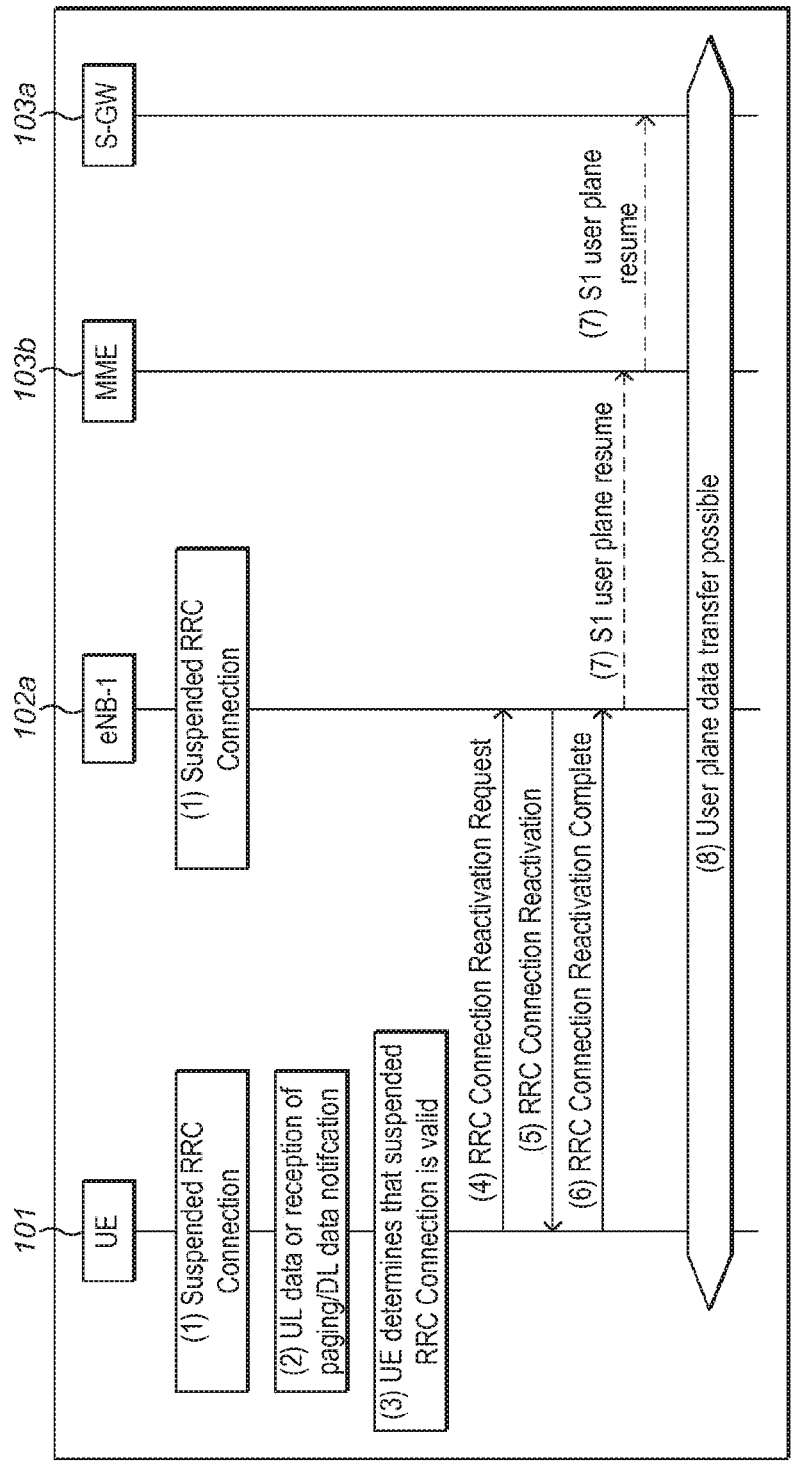
FIGS. 17, 18 and 19 show message sequence charts illustrating RRC reactivation methods for handling the resumption of user plane data transfer for a UE having a suspended RRC Connection with a RAN.

FIG. 17 shows a message sequence chart representing the RRC reactivation method for a UE 101 with a suspended RRC Connection with eNB1 102a (1). RRC Connection Reactivation is triggered by UL data being generated in the UE 101, or by the reception of a paging or DL data notification message (2). The UE 101 determines that its suspended RRC Connection is valid for the cell on which it is located (3). The UE 101 initiates an RRC Connection Reactivation procedure by sending an RRC Connection Reactivation Request (4). On receipt of this message the eNB1 102a checks that it has a valid suspended RRC Connection for this UE 101. If it has a valid suspended RRC Connection then it sends an RRC Connection Reactivation message to the UE 101 (5) and the UE 101 responds with an RRC Connection Reactivation Complete message (6). The RRC Connection Reactivation message may or may not include configuration updates to one or more of the previously-stored RRC connection parameters for the UE to use following the reactivation. The UE 101 can now start to send any user plane data that it may have buffered (8). If the S1 user plane had been suspended the eNB1 102a may send an S1 user plane resume message to the S-GW 103a (7) (possibly via the MME 103b as shown as optional by the dotted lines in FIG. 17) and on receipt of this the S-GW 103a can resume the S1 user plane and start to forward to the eNB1 102a any DL user plane data that may be buffered in the S-CW 103a (8). As an alternative, and if the S1 connection was suspended only in the DL direction, the reception of UL user plane data from the UE 101 may be used by the S-GW 103a as an implicit S1 user plane resume message.

Figure 18:
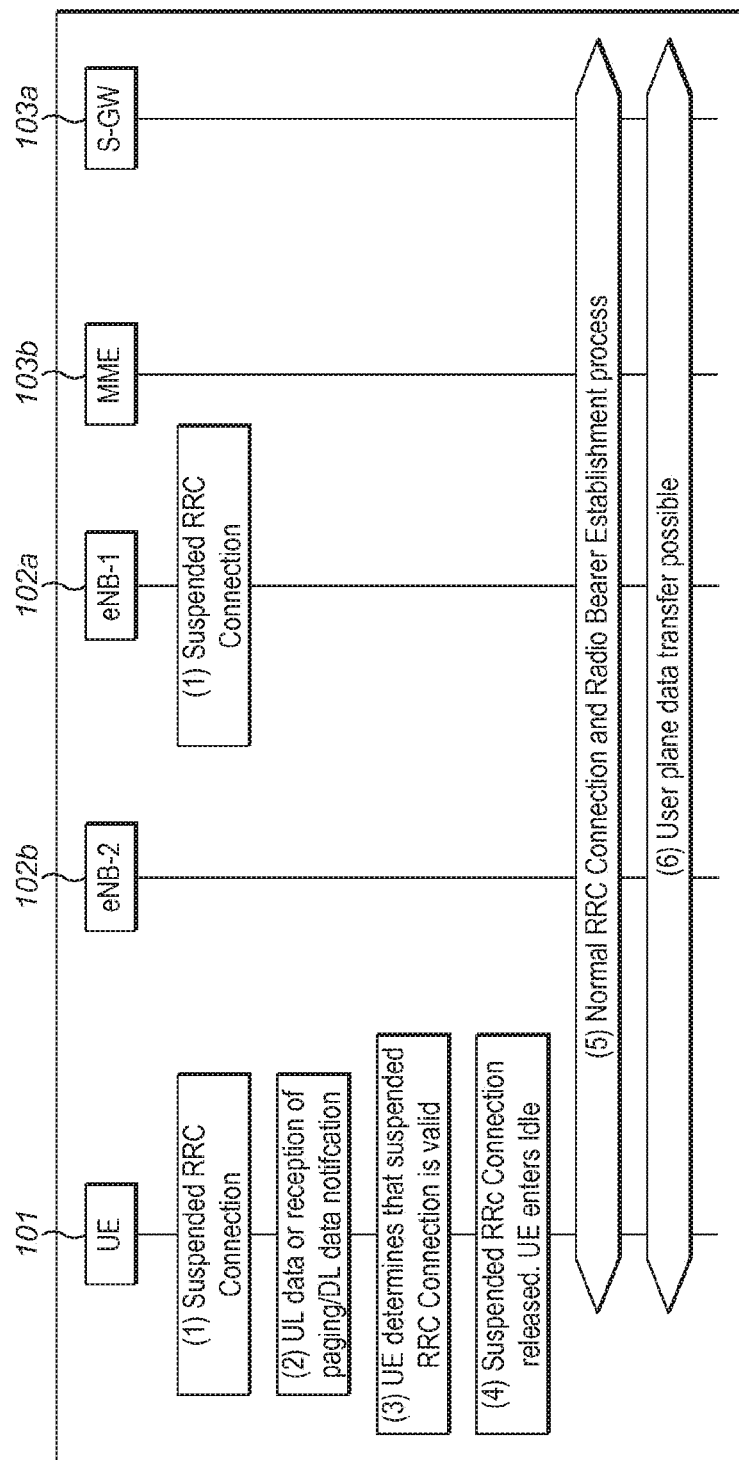

FIG. 18 shows a message sequence chart representing another RRC reactivation method for a UE 101 with a suspended RRC Connection with eNB1 102a (1) but which is no longer valid. RRC Connection Reactivation is triggered by UL data being generated in the UE 101, or by the reception of a paging or DL data notification message (2). In this case, the UE 101 determines that its suspended RRC Connection is not valid for the cell on which it is located (3) (for example, this may be the case if the UE 101 is on a cell under eNB2 102b). The UE 101 releases its suspended RRC Connection and enters the RRC idle state (4). The UE 101 then initiates a normal procedure for establishing an RRC Connection towards eNB2 102b and establishing user plane radio so bearers (i.e. the UE initiates NAS Service Request procedure) (5) and on completion of this procedure user plane data transfer is possible (6).

Figure 19:
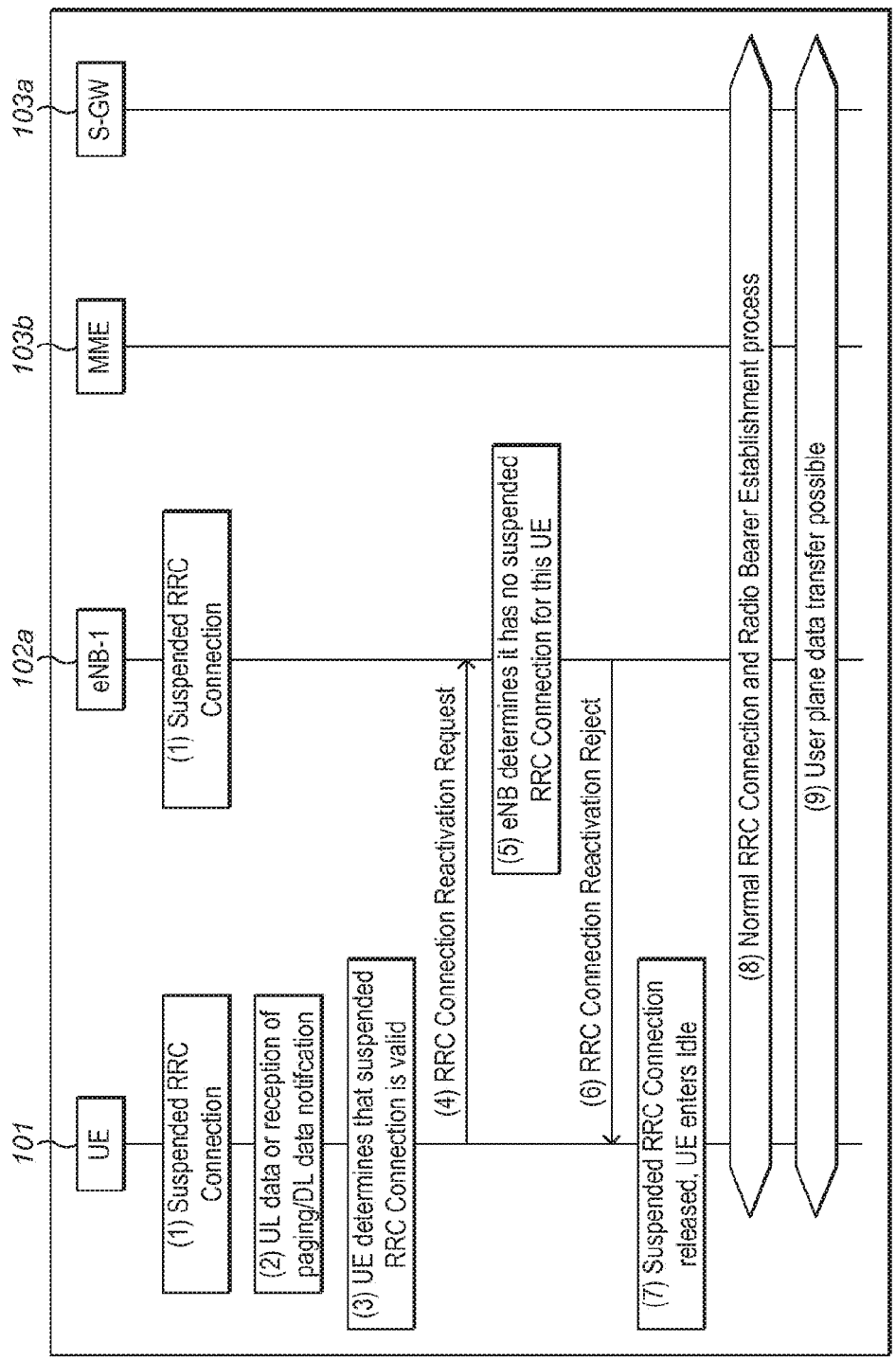

FIG. 19 shows a message sequence chart representing another RRC reactivation method for a UE 101 with a suspended RRC Connection (1), which the eNB1 102a determines is invalid, RRC Connection Reactivation is triggered by UL data being generated in the UE 101, or by the reception of a paging or DL data notification message (2). The UE 101 determines that its suspended RRC Connection is valid for the cell on which it is located (3). The UE 101 initiates an RRC Connection Reactivation procedure by sending an RRC Connection Reactivation Request (4). On receipt of this message the eNB1 102a checks that it has a suspended RRC Connection for this UE 101 and may also check whether all required parameters of the stored RRC connection remain valid. In this case the eNB1 102a determines that it does not have a suspended RRC Connection for the UE 101 or that some of the stored RRC connection parameters are invalid (5). This may be due, for example, to expiry of a validity timer in the eNB1 102a. Alternatively, it may be due to eNB1 102a having assigned some of the resources associated with the suspended RRC connection to another UE, or due to eNB1 102a otherwise determining that for any valid reason, parts or all of the suspended RRC connection are no longer valid. In a further alternative. It may due to the UE 101 accessing an eNB that is different from the one which has the UE's suspended RRC Connection. The eNB1 102a responds with an RRC Connection Reactivation Reject message (6). The UE 101 releases its suspended RRC Connection and enters RRC idle mode (7). The UE 101 then initiates a normal procedure for establishing an RRC Connection and establishing user plane radio bearers (i.e. the UE 101 initiates a NAS Service Request procedure) (8) and on completion of this procedure user plane data transfer is possible (9).

It may be necessary for the UE 101 to know that the eNB 102a,b . . . n supports the new signalling RRC Connection Reactivation Request/Setup/Reject signaling before it initiates that signalling towards the eNB 102a,b . . . n. To address this, an eNB 102a,b . . . n may broadcast a support indicator in system information. This could be a general indicator to indicate support for all the RRC Connection suspension functionality or it could just indicate support for the Request/Setup/Reject signalling. If the UE 101 sees that the eNB 102a,b . . . n does not support the functionality then the UE 101 would release its suspended RRC connection and then initiate a Service Request procedure.

An alternative to the eNB 102a,b . . . n broadcasting a support indicator would be for the eNB 102a,b . . . n that initially suspends the UE's RRC Connection to set the area based validity criteria in a way to ensure that the UE 101 only attempts to reactivate a suspended RRC Connection on a cell/eNB 102a,b . . . n that is known to support the functionality. In the simplest case the eNB 102a,b . . . n that suspends the UE's RRC Connection would only include in the validity criteria cells that are located under the same eNB 102a,b . . . n.

Table 2 below summarises the four possible combinations of RRC Connection Suspension Alternatives A or B with Mobility Alternatives A or B described above. For each combination, Table 2 describes in what status the RRC Connection and the S1 user plane connection would reside at various points in time. The status of the RRC Connection and S1 user plane may be:

Idle—no RRC Connection exits, no S1 user piano is established eNB1/2—an RRC Connection exists with eNB1 or eNB2, an S1 user plane is established between S-GW and eNB1 or eNB2

Suspended (eNB1)—a suspended RRC Connection exists with eNB1, the S1 user plane between S-GW and eNB1 is suspended The columns of the table T0-T2 relate to different times/instances and are defined with reference to FIG. 9.

T0—UE 101 in location 1 of FIG. 9, before RRC Connection is suspended

T1—UE 101 in location 1 (or location 2, if the UE 101 has performed cell reselection) of FIG. 9, after RRC Connection is suspended T2—UE 101 in location 3 of FIG. 9.

TABLE 2

| Combination | Connection | T0 | T1 | T2 (move to cell under eNB2 while suspended) |
|---|---|---|---|---|
| 1/ RRC Sus Alt A, Mobility Alt A | S1 | eNB1 | eNB1 | eNB1 |
| | RRC | eNB1 | Suspended (eNB1) | Suspended (eNB1) |
| 2/ RRC Sus Alt B, Mobility Alt A | S1 | eNB1 | Suspended (eNB1) | Suspended (eNB1) |
| | RRC | eNB1 | Suspended (eNB1) | Suspended (eNB1) |
| 3/ RRC Sus Alt A, Mobility Alt B | S1 | eNB1 | eNB1 | idle/eNB2/Suspended (eNB1) |
| | RRC | eNB1 | Suspended (eNB1) | idle/eNB2/Suspended (eNB1) |
| 4/ RRC Sus Alt B, Mobility Alt B | S1 | eNB1 | Suspended (eNB1) | idle/eNB2/Suspended (eNB1) |
| | RRC | eNB1 | Suspended (eNB1) | idle/eNB2/Suspended (eNB1) |

It should be noted that for combinations 3 and 4 shown in Table 2, three possible cases are shown for the condition of the RRC and S1 connections corresponding to the signalling variants 1/2/3 respectively which may be adopted within Mobility Alternative B.

In addition, it should be noted that combination 4, which corresponds to RRC Connection Suspend alternative B and Mobility alternative B, is shown in the table for completeness. However, with this alternative the S1 user plane is suspended as soon as the RRC Connection is suspended, meaning that any DL data will be buffered at the S-GW 103*a* until the UE 101 has been paged/notified and has reactivated its RRC Connection. Thus there may be little benefit to performing any signalling when the UE 101 moves to a cell under a different eNB 102*a*, *b*, . . . *n*.

Given that the various possible processes for handling an RRC connection suspension in accordance with the present disclosure have been described above, a number of example scenarios will now be described showing how these various suspended RRC connection handling procedures can operate together.

Example Scenario 1

Figure 20:
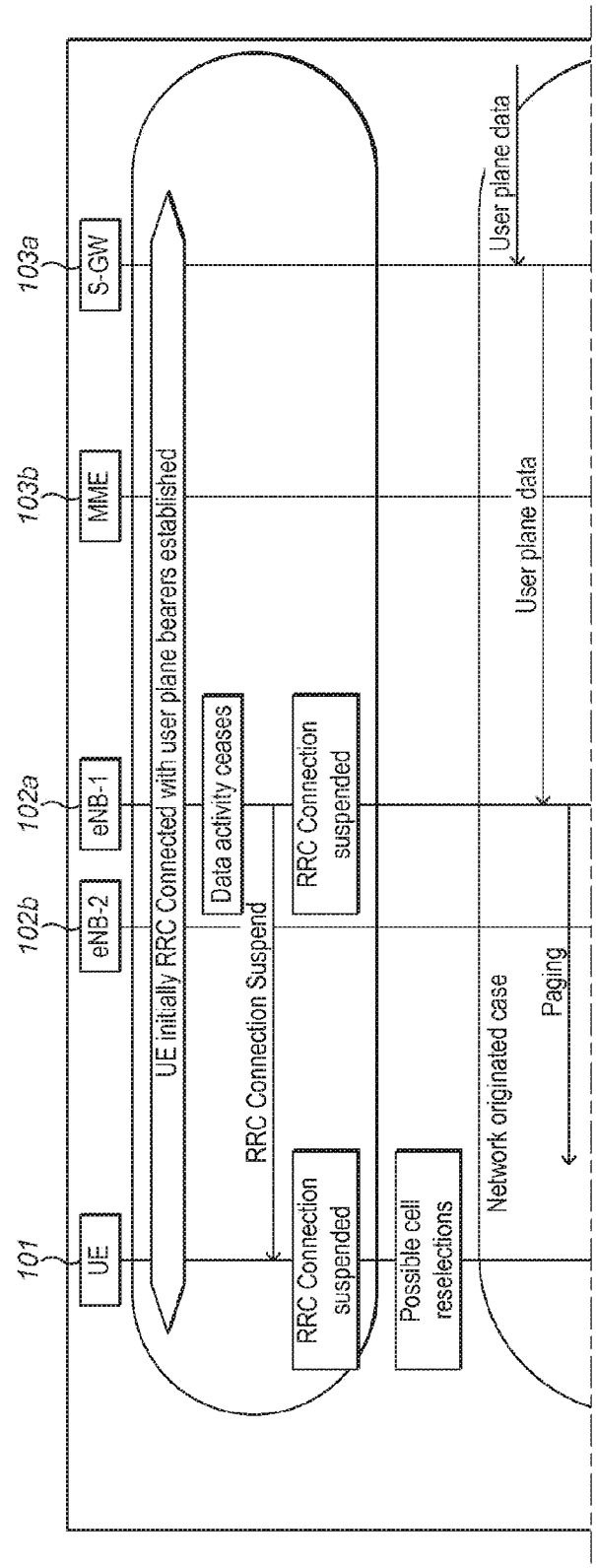
FIG. 20 show a message sequence chart illustrating the method of handling an RRC connection suspension in Example Scenario 1.
Figure 20:
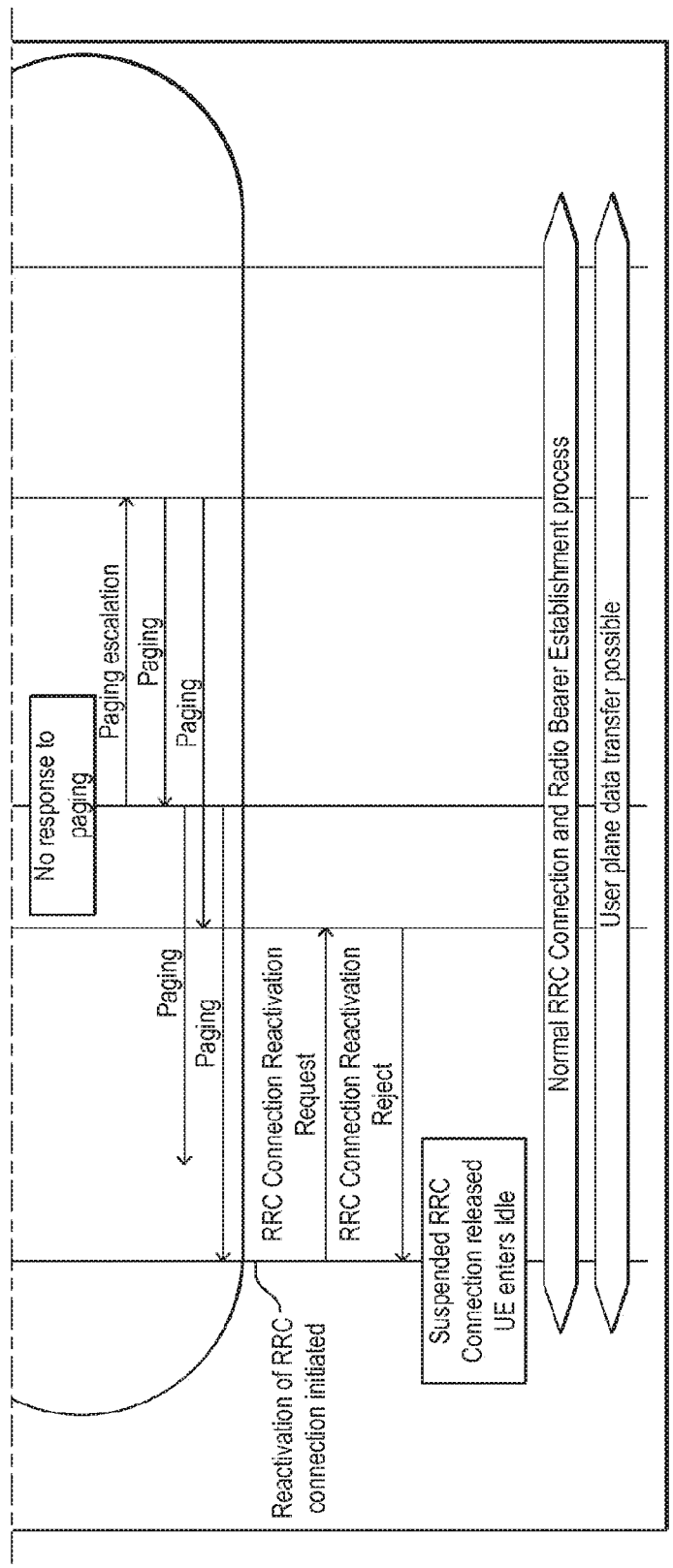

FIG. 20 shows a message sequence chart representing a possible handling of the suspension and later attempted reactivation of an RRC connection between UE 101 and a RAN 102 in which (at the time of the reactivation attempt) the UE 101 has moved out of the cell(s) where the suspended RRC connection is valid in accordance with suspension alternative A (CN not informed of the RRC suspension) and mobility alternative A (network not informed of mobility) described above. Due to this processing, the CN 103 is not aware that the RRC connection is suspended and hence the S1 connection is not suspended. When DL data arrives at the network, the network does not know for certain the cell in which the UE 101 is currently located, nor does it know whether any suspended context is valid. The S1 connection is not suspended end remains active, hence DL data incident at SGW 103*a* is forwarded via S1 to eNB1 102*a*. eNB1 102*a* attempts to contact the UE 101 via transmission of a paging message and in the absence of a response, a paging escalation approach is used in order to contact the UE 101. The suspended RRC Connection is not valid in the cell in which the UE 101 is found and so it is released and a fresh RRC Connection is established for the data to be delivered. With reference to FIG. 20, the steps of the sequence in this scenario are:

1. UE 101 is initially in RRC connected with user piano bearers established such that it is possible for user data to be transferred between UE 101 and S-GW 103*a* and then on to the P-GW 103*c* (not shown in FIG. 20) and beyond.
2. Data activity ceases and eNB-1 102*a* decides change the UE 101 to UE-controlled mobility and to suspend the RRC connection.
3. eNB-1 102*a* send a message to the UE 101 to instruct it to enter UE-controlled mobility and to suspend the RRC connection. For example this message may be called RRC Connection Suspend as shown in the Figure, or may be called RRC UE controlled mobility command, or some other suitable name.
4. eNB-1 102*a* and UE 101 suspend the RRC connection. The UE 101 performs UE-controlled mobility as if in idle mode.
5. When the UE 101 has suspended the RRC connection and enters UE-controlled mobility, cell reselections may occur. As long as the UE 101 remains within a registered TA then these reselections do not trigger any signalling towards the network (i.e. the network is not made aware of the reselections in mobility alternative A). Steps 1-5 (excepting the cell reselections) are indicated in FIG. 20 in the upper rectangle having rounded ends.
6. After a period, when an RRC connection with UE 101 is once again heeded, in the networking-originated case, user plane data arrives in the S-GW 103*a*. S-GW 103*a* immediately forwards the data on the S1 user plane interface to the eNB1 102*a*. On arrival of the user plane data in the sNB1 102*a* the eNB1 102*a* sends a paging message to the UE 101 in order to trigger the RRC Connection Reactivation. However, in this case eNB-1 102*a* does not receive any response to this paging message, and thus eNB-1 102*a* can conclude that the UE 101 is no longer located in a cell under its control. In order to contact the UE 101 that may be located in a cell under a different eNB 102*b*, . . . *n* the eNB-1 102*a* must escalate the paging, meaning that it must trigger the MME 103*b* to send paging requests to other eNBs 102*b*, . . . *n* to page the UE 101 within the TA(s) in which the UE 101 is currently registered, in this example scenario in FIG. 20 the escalation causes eNB-2 102*b* to send a page and this is successfully received by the UE 101.
7. The UE 101 sends the RRC Connection Reactivation Request to the eNB-2 102*b*. As an alternative Step 7, the UE 101 may be able to determine prior to sending the RRC Connection Reactivation Request to the eNB-2 102*b* that the reactivation attempt will not be successful on this cell. For example the UE 101 may be able to determine this from the Cell ID of the cell, or eNB ID of the cell or some additional indicator that may be sent in the paging message. If the UE 101 does determine that the reactivation will not be successful then the UE 101 does not transmit RRC Connection Reactivation Request but jumps directly to step 9.
8. Due to the fact that in this case the eNB-2 102*b* does not have the UE's suspended RRC Connection, the eNB2 102*b* responds with a RRC Connection Reject.
9. The UE 101 releases its (suspended) RRC connection and enters RRC idle mode. The UE 101 then performs a normal RRC Connection Establishment procedure in order to setup up a new RRC connection and continue user plane activity.

Example Scenario 2

Figure 21:
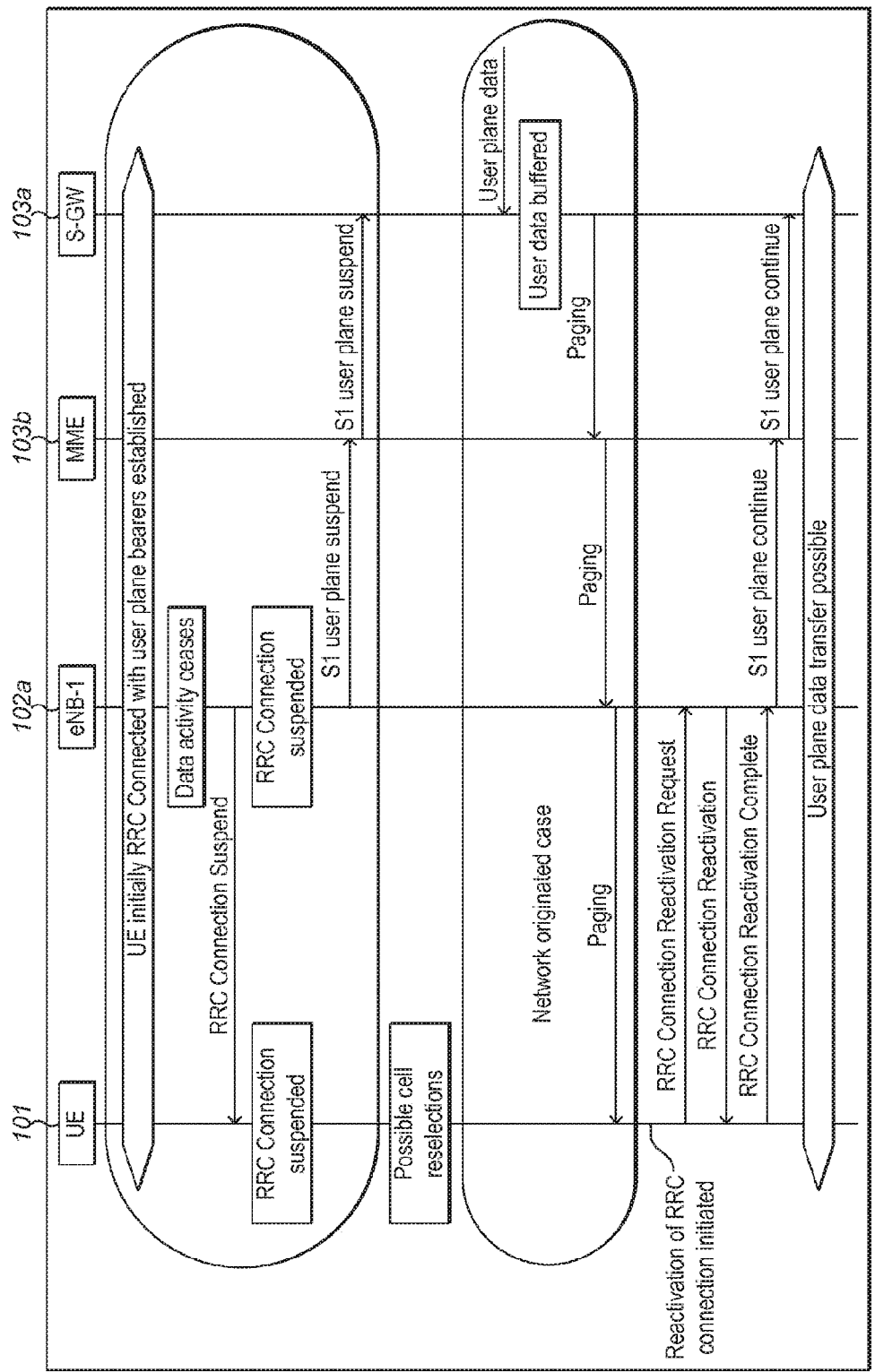
FIG. 21 snows a message sequence chart illustrating the method of handling an RRC connection suspension in Example Scenario 2.

FIG. 21 shows a message sequence chart representing a possible handling of the suspension and later reactivation of an RRC connection between UE 101 and a RAN 102 in which the UE 101 has initially moved out of the cell(s) where the suspended RRC connection is valid (and may have reselected a number of times) but when the data activity is to be resumed the UE 101 is once again camped on a cell where the suspended RRC Connection is valid and hence it can be successfully reactivated in accordance with suspension alternative B and mobility alternative A described above.

In accordance with suspension alternative B (CN is informed of the RRC suspension) and mobility alternative A (network is not informed of mobility), if the UE 101 reselects away from the cell (or cells) on which the suspended RRC connection is valid, the UE 101 does not perform any signalling to inform the network (unless the reselection results in the UE crossing a TA boundary such that a 'normal' TAU is needed). Thus when DL data arrives the network does not know for certain the cell in which the UE is currently located, hence nor does it know whether any suspended context is valid.

The steps of the sequence are:
1. UE 101 is initially in RRC connected with user plane bearers established such that it is possible for user data be transferred between UE 101 and S-GW 103a and then on to the R-GW 103c (not shown in FIG. 21) and beyond.
2. Data activity ceases and eNB-1 102a decides to change the UE 101 to UE-controlled mobility and to suspend the RRC connection
3. eNB-1 102a sends a message to the UE 101 to instruct it to enter UE-controlled mobility and to suspend the RRC connection. For example this message may be called RRC Connection Suspend as shown in FIG. 21, or may be called RRC UE-controlled mobility command, or some other suitable name.
4. eNB-1 102a and UE 101 suspend the RRC connection. The UE 101 performs UE controlled mobility as if in idle mode.
5. eNB-1 102a informs the CN 103 (MME 103b or S-GW 103a or both) about the RRC suspension. The message to inform the CN 103 may be called S1 user plane suspend. On reception of this by the CN 103, the S1 user plane bearers remain established but are suspended (user plane transmission ceases) and the S-GW 103a, on reception of downlink user plane data, will not immediately forward that data over the S1 user plane towards the eNB-1 102a and will instead buffer the data pending its delivery. The S1 user plane suspension may only affect the way that the S-GW 103a treats DL user data arriving in the S-GW 103a. Hence, in this case it may be considered as just a DL S1 user plane suspension.
6. When the UE 101 has suspended the RRC connection and enters UE-controlled mobility, cell reselections may occur. As long as the UE 101 remains within a registered TA then these reselection do not trigger any signalling towards the network (i.e. the network is not made aware of the reselections). Steps 1-6 (excepting the cell reselections) are shown in FIG. 21 in the upper rectangle having rounded ends.
7. In the network-originating case for data transfer activation with the UE 101, user plane data arrives in the S-GW 103a. Due to the S1 user plane suspension, this user plane data is buffered at the S-GW 103a instead of being immediately forwarded on the S1 user plane interface to the eNB-1 102a. The S-GW 103a then initiates a paging procedure to contact the UE 101 in whichever cell it may be located. This is quite similar (or identical) to the paging procedure used when the UE 101 is idle. The paging indication is sent from the S-GW 103a to the MME 103b and to one or more eNBs 102a,b . . . n located within the TA(s) in which the UE 101 is registered. The reception of a paging message in the UE 101 triggers the UE 101 to attempt the RRC Connection Reactivation. This is shown within the lower rectangle having rounded ends. In the UE-originating case the elements in the lower rectangle do not occur and the arrival of user data in at the UE 101 directly triggers the UE 101 to attempts the RRC Connection Reactivation.
8. The remainder of the steps in FIG. 21 represent the sequence of events when the UE 101 attempts the RRC Connection Reactivation on a cell where the associated eNB-1 102a does have the UE's suspended RRC Connection (i.e. the eNB does have the stored UE context information). This cell may be the cell the UE 101 was on when the RRC connection was suspended or it may be another cell controlled by the same eNB-1 102a. The UE 101 sends the RRC Connection Reactivation Request to the eNB-1 102a.
9. Due to the fact that in this case the eNB1 102a does have the UE's suspended RRC Connection, the eNB-1 102a responds with an RRC Connection Reactivation. This message may contain some new or updated parameter values if the eNB1 102a wishes to change any part of the configuration that was previously suspended, or it may be a very simple 'continue' message (e.g. without any parameter or configuration updates).
10. The UE 101 responds with an RRC Connection Reactivation Complete. This is an optional step, only needed if the eNB-1 102a requires extra assurance that the RRC Connection Reactivation has been successful in the UE-originated case, uplink user data from the UE may start to be transmitted as soon as the RRC Connection Reactivation has been received.
11. The eNB-1 102a informs the CN 103 (MME 103b or SGW 103a or both) that the S1 user plane can continue. This may be an explicit message as shown in FIG. 21. Alternatively, in the UE-originated case, and in the case that only the DL of the S1 was originally suspended, uplink user data from the UE 101 sent from eNB-1 102a to S-GW 103a may be considered as an implicit 'continue' command by SGW 103a.
12. On reception of the indication to continue the S1 user plane, the S-GW 103a will stop buffering the downlink user plane data and will forward it over the reactivated S1 user plane to the eNB-1 102a for transmission to the UE 101.

Example Scenario 3

Figure 22:
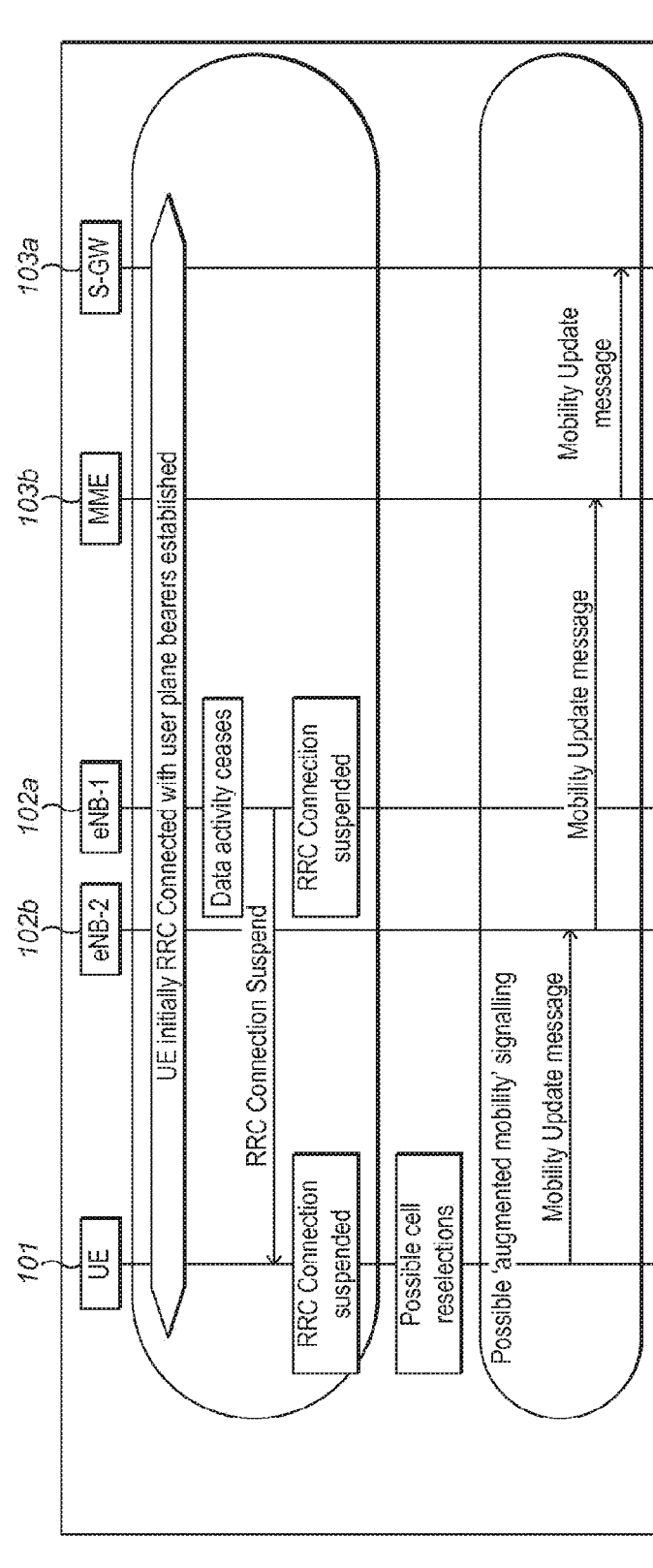
FIG. 22 shows a message sequence chart illustrating the method of handling an RRC connection suspension in Example Scenario 3.
Figure 22:
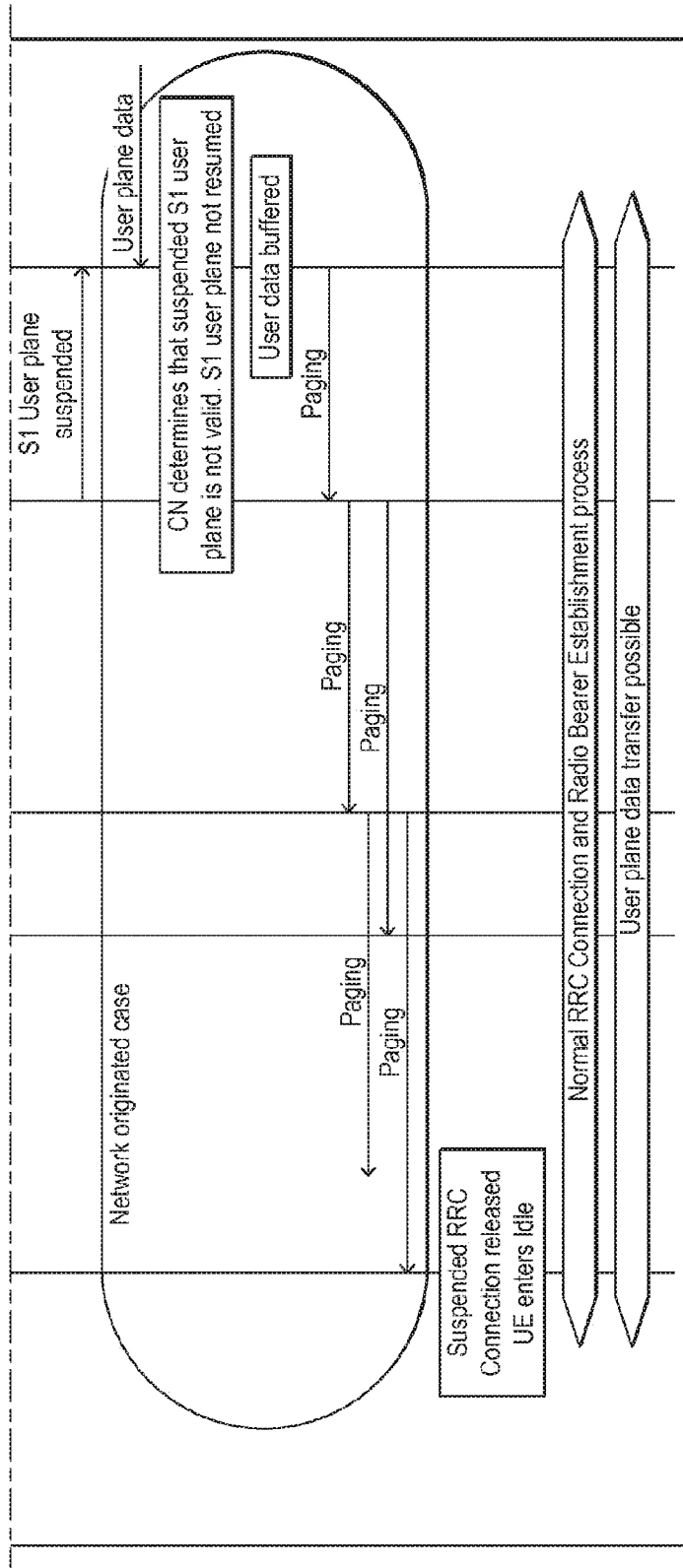

FIG. 22 shows a message sequence chart representing a possible handling of the suspension and later reactivation of an RRC connection between UE 101 and a RAN 102. The CN 103 is not informed of the RRC suspension, but the UE 101 does inform the CN 103 when it moves out of the cell(s) where the RRC connection is valid. In accordance with suspension alternative A and mobility alternative B described above.

In summary this shows the method carried out when the UE 101 has moved out of the cell(s) where the suspended RRC connection is valid, and has informed the CN 103 about moving out of the suspension cells via a mobility update message, so that the S1 is then suspended. When DL data arrives at the network the UE 101 is paged, the suspended RRC Connection is net valid in the cell and so it is released and a fresh RRC Connection is established for the data to be delivered.

In this case the CN 103 does not initially know that the UE's RRC connection has been suspended. A validity indicator may however still be maintained in the CN 103 for each connected mode UE 101. This indicator may be set based upon location update information known to the CN 103 (e.g. the MME 103*b*). Whilst in the connected mode, the CN 103 expects that UE 101 mobility events (for example to another cell or eNB 102*b*, . . . *n*) result in a corresponding handover of the S1-U and S1-MME beams to that eNB. Tracking area updates are expected only from idle mode UEs. Whilst the validity criteria are met, the CN 103 continues to behave as normal for a connected mode UE 101.

The use of mobility alternative B means that a UE 101 with a suspended RRC connection (and of which the CN 103 may or may not yet be aware) may perform autonomous mobility procedures and may be configured to send a tracking area update (or other location update) message to the CN 103 (e.g. the MME 103*b*) in the event that it leaves or re-enters the cell (or group of cells) for which the suspended RRC connection is valid.

If the CN 103 has not been informed at the time of a suspension, the MME 103*b* initially believes the UE 101 to be still RRC-connected (i.e. not suspended) unless it learns otherwise. If the UE 101 is configured to send the additional/augmented mobility messages of mobility alternative B (e.g. TAU) when suspended, the MME 103*b* may subsequently inter from receipt of a TAU that the UE's RRC connection has in fact been suspended and that the UE 101 is currently camped on a cell (or group of cells) for which the suspended RRC connection is not valid. Thus, the MME 103*b* is simultaneously and indirectly informed both that the UE's RRC connection has been suspended and that it is not currently valid. It will therefore be appreciated that the signalling of additional/augmented mobility messages by the UE 101 may also serve as messages informing CN nodes (such as MME 103*b* and SGW 103*a*) of a previous RRC suspension.

The CN 103 (e.g. MME 103*b*) may choose to subsequently suspend the S1 connection in such a case. The MME 103*b* may optionally reactivate the S1 in the event that it receives a further TAU or mobility message from the UE 101 indicating that it has re-entered a call (or group of cells) for which the suspended RRC connection is once again valid.

Within this example scenario 3 a number of different sub-scenarios are possible depending on whether the data activity causing a need for an RRC connection is network- or UE-originating, and whether the suspended RRC connection is still valid at the time a reactivation is required. These different sub-scenarios affect how the wireless communication system handles the processing to resume Uu user plane communications. With reference to FIG. 22, the following describes the processing that occurs when the data activity is network-originated and the suspended RRC connection is invalid at the time of required reactivation. Processing for other sub-scenarios may be derived using logical combinations of previously described processing steps and is within the scope of the present disclosure.

1. During RRC connection suspension (shown in the upper rounded rectangle) the eNB-1 102*a* does not inform the CM 103 of the RRC suspension and the S1 connection is maintained.
2. The UE 101 reselects to a cell assigned to eNB-2 102*b* in which the RRC connection is not valid.
3. The UE 101 sends an 'augmented' mobility message to MME 103*b*, possibly via a temporary RRC connection with eNB-2 102*b*, or via other means not requiring establishment of a temporary RRC connection with eNB2 102*b* (middle rectangle).
4. On receipt of the mobility message, MME 103*b* sends a message to S-GW 103*a* to suspend the existing S1 connection between SGW 103*a* and eNB1 102*a*. Thus, the MME 103*b* and S-GW 103*a* have been implicitly informed that the RRC connection for UE 101 has been previously suspended and that the suspended RRC connection is currently invalid.
5. Data addressed to the UE 101 arrives from an external network 104 into the PGW 103*c* (not shown in FIG. 22).
6. The data is forwarded to the UE's SGW 103*a* via the established S5/8 bearer
7. The SGW 103*a* and MME 103*b* are aware that the RRC connection for this UE 101 is suspended and data is not able to be forwarded over the (suspended) S1-U connection. Hence the data is temporarily buffered by the SGW 103*a*.
8. The CH 103 (e.g. the MME 103*b*) checks its locally-stored validity status for the suspended RRC connection. For example, this may involve checking a location validity indicator or a timer-based validity indicator as previously described
9. The CN 103 (e.g. MME 103*b*) determines that the suspended RRC connection is not valid.
10. The MME 103*b* invokes normal idle-mode RRC connection establishment procedures:
    a. The MME 103*b* sends a paging request to eNBs 102*a,b* . . . *n* within the currently-known tracking area location of the UE 101.
    b. eNBs 102*a,b*, . . . *n* in receipt of the paging request send a paging message within cells under their control. The paging message identifies the UE 101 they are attempting to contact.
    c. The UE 101 responds to the page in the cell in which it is currently camped. The UE 101 responds to the page in the normal way by initiating a normal RRC connection establishment procedure.
    d. The eNB-2 102*b* (in conjunction with the MME 103*b*) establishes a new RRC connection with the UE 101 and S1-U and S1-MME; bearers are set up between eNB2 102*b* and the SGW 103*a* and the MME 103*b* respectively
11. The data is transferred over the newly-established S1-U from the SGW 103*a* to the eNB2 102*b* (note that the previously-stored and suspended S1-U may be released)
12. The user data is communicated from the eNB-2 102*b* to the UE via the Uu Aspects of the present disclosure relating to the operation of a UE to suspend an RRC connection will now be set out in the following numbered clauses.

1. A method, implemented in a user equipment (UE) for use with a Radio Access Network (RAN), comprising:
the UE suspending an established RRC connection with the RAN;

the UE monitoring, whilst the RRC connection is suspended, for at least one of: paging and notifications of downlink data for the UE; and the UE storing RRC connection data related to the suspended RRC connection, said RRC connection data being usable by the UE to reactivate the suspended RRC connection.

2. A method as set out in clause 1, wherein RRC connection data comprises data representing one or more of:
the configuration of radio bearers in the established RRC connection;
security parameters relating to the established RRC connection;
temporary cell identifiers;
MAG configuration;
Physical Layer configuration.

3. A method as set out in clause 1 or 2, further comprising marking the stored RRC connection data to indicate the suspension of the RRC connection.

4. A method as set out in clause 1, 2 or 3, wherein the UE suspends the established RRC connection in response to an RRC connection suspension criterion being met.

5. A method as set but in clause 4, the RRC connection suspension criteria comprising one or more of:
the expiry of a timer at the UE;
reception of a message at the UE.

6. A method as set out in any preceding clause, wherein the RAN has an established user plane connection with a Core Network (CN) for the UE, the method further comprising maintaining the established user plane connection between the RAN and the CN while the RRC Connection is suspended.

7. A method as set out in clause 8, wherein when the RAN node for which the suspended RRC connection is valid receives from the CN downlink data for the UE, the RAN node buffers the downlink date and pages the UE a transmits a notification of downlink data for the UE.

8. A method as set out in clause 7, wherein, in response to the RAN node receiving no response from the UE to the paging or to the notification of downlink data, the RAN node sends to the CN a paging escalation message.

9. A method as set out in any of clauses 1-5, further comprising the UE or a RAN node sending a message to inform any node in the Core Network (CN) that the RRC connection is suspended.

10. A method, as set out in clause 9, wherein the RAN has an established user plane connection with the CN for the UE, the method further comprising suspending the established user plane connection between the CN and the RAN.

11. A method as set out in clause 10, wherein the message sent to the CN includes an identification of the UE, the method of suspending the established user plane connection between the CN end the RAN comprising the RAN or one or more nodes in the CN or both:
discontinuing transmission and reception of user plane data for the UE over the established user plane connection between the RAN and the CN; and
storing CN-RAN connection data representing the established user plane connection, said CN-RAN connection data being usable to later resume transmission and reception of user plane data to the UE by reactivating said user plane connection between the RAN and the CN as the result of an RRC connection reactivation process.

12. A method as set out in clauses 10 or 11, wherein when downlink data for the is received at the CN, a node of the CN buffers the downlink data and the CN initiates the paging of the UE by one or more cells of the RAN.

13. A method as set out in clauses 10, 11 or 12, further comprising a node of the CN maintaining a validity indicator for the UE, said validity indicator being usable in checking the validity of the said RRC connection as part of the RRC connection reactivation process.

14. A method as set out in clause 13, wherein the value of the validity indicator is dependent on one or more of: the location of the UE; a timer.

15. A method as set out in any preceding clause, further comprising:
the UE performing autonomous mobility control by cell selection or reselection processes during the time that the RRC connection is suspended and the UE relinquishing mobility control to the RAN as a result of the reactivation of the suspended RRC connection or a normal RRC connection process to establish a new RRC connection with the UE.

16. A method as set out in clause 15, wherein when the UE selects a cell of the RAN in which the suspended RRC Connection represented by the stored RRC connection data is invalid, the UE continues to store the RRC connection data and omits to perform any communication with the CN to inform the CN of the mobility of the UE.

17. A method as set out in clause 15, wherein when the UE selects a cell of the RAN in which the suspended RRC Connection represented by the stored RRC connection data is invalid, the UE transmits a message informing the RAN or the CN of this event.

18. A method as set out in clause 17, wherein the UE also releases the RRC connection and enters idle mode as the result of selecting a cell of the RAN in which the suspended RRC Connection represented by the stored RRC connection data is invalid.

19. A method as set out in clause 17 or 18, wherein receipt by the RAN or the CN of the message sent by the UE causes the RAN or CN to perform one or more of: release the invalid RRC Connection; initiate a normal RRC connection process to establish a new RRC connection with the UE; release an established user plane connection for the UE between the CN and RAN.

20. A method as set out in clause 15, wherein when the UE selects a cell of the RAN in which the suspended RRC Connection represented by the stored RRC connection data is invalid, the UE continues to store the RRC connection data and transmits a message informing the RAN or the CN of this event.

21. A method as set out in any preceding clause, further comprising:
the UE determining whether or not the suspended RRC connection is still valid by reference to the stored RRC connection data; and
in response to the UE determining that the suspended RRC connection is still valid, the UE sending an RRC connection reactivation request message to the RAN.

22. A method as set out in clause 21, further comprising:
in response to receiving an RRC connection reactivation complete message from the RAN, the UE resuming user plane data transfer with the RAN over the reactivated RRC connection.

23. A method as set out in clause 22, further comprising:
in response to receiving an RRC connection reactivation reject message from the RAN, the UE releasing the suspended RRC connection and entering idle mode; and
the UE thereafter initiating a normal RRC connection establishment process to establish a new RRC connection with the RAN.

24. A method of clause 23, wherein a RAN node transmits the RRC connection reactivation reject message to the UE in response to the RAN node determining that it does not have a valid suspended RRC connection for the UE.

25. A method as set out in any preceding clause, further comprising:
   the UE determining whether or not the suspended RRC connection is still valid by reference to the stored RRC connection data;
   in response to the UE determining that the suspended RRC connection is invalid, the UE releasing the suspended RRC connection and entering idle mode; and
   the UE thereafter initiating a normal RRC connection establishment process to establish a new RRC connection with the RAN.

26. A method of any of clauses 21 to 25, wherein the UE determining whether or not the suspended RRC connection is still valid composes at least one of:
   determining whether the UE is currently in a cell of the RAN in which the suspended RRC Connection represented by the stored RRC connection data is still valid; and
   determining whether a timer has not expired.

27. A method of clauses 21-26, further comprising the UE relinquishing mobility control of the UE to the RAN as a result of the reactivation of the suspended RRC connection or the establishment of a new RRC connection.

28. A method of any preceding clause, further comprising initiating the reactivation of the suspended RRC connection in response to:
   the UE generating uplink data via the user plane of an RRC connection; or
   reception at the UE paging; or
   reception at the UE of a notification that the RAN or the CN has downlink data buffered to send to the UE.

29. A method as set out in any preceding clause, wherein the UE is configured to communicate with the RAN in accordance with the LTE or LTE Advanced protocols.

30. A method as set out in any preceding clause, wherein the RAN is configured to communicate with the UE in accordance with the LTE or LTE Advanced protocols.

31. A method as set out in any preceding clause, wherein the RAN node or nodes is/are eNode B(s).

32. A User Equipment (UE) for use with a Radio Access Network (RAN), the UE being configured to:
   suspend an established RRC connection with the RAN;
   monitor, whilst the RRC connection is suspended, for at least one of: paging and notifications of downlink data for the UE; and
   store RRC connection data representing the suspended RRC connection, said RRC connection data being usable by the UE to reactivate the suspended RRC connection.

33. A UE as set out in clause 32, wherein RRC connection data comprises data representing one or more of:
   the configuration of radio bearers in the established RRC connection;
   security parameters relating to the established RRC connection;
   temporary cell identifiers;
   MAC configuration;
   Physical Layer configuration.

34. A UE as set out in clause 32 or 33, further comprising the UE being configured to mark the stored RRC connection data to indicate the suspension of the RRC connection.

35. A UE as set out in clause 32, 33 or 34, further comprising the UE being configured to suspend the established RRC connection in response to an RRC connection suspension criterion being met.

36. A UE as set out in clause 35, wherein the RRC connection suspension criteria comprise one or more of:
   the expiry of a timer at the UE;
   reception of a message at the UE.

37. A UE as set out in any of clauses 32-36, further comprising:
   the UE being configured to perform autonomous mobility control by cell selection or reselection processes during the time that the RRC connection is suspended and the UE relinquishing mobility control to the RAN as a result of an the reactivation of the suspended RRC connection or a normal RRC connection process to establish a new RRC connection with the UE.

38. A UE as set out in clause 37, the UE being configured such that, when the UE selects a cell of the RAN in which the suspended RRC Connection represented by the stored RRC connection data is invalid, the UE continues to store the RRC connection data and omits to perform any communication with the CN to inform the CN of the mobility of the UE.

39. A UE as set out in clause 37, the UE being configured such that, when the UE selects a cell of the RAN in which the suspended RRC Connection represented by the stored RRC connection data is invalid, the UE transmits a message informing the RAN or the CN of this event.

40. A UE as set out in clause 39, the UE being configured such that the UE also releases the RRC connection and enters idle mode as the result of selecting a cell of the RAN in which the suspended RRC Connection represented by the stored RRC connection data is invalid.

41. A UE as set out in clause 39 or 40, wherein receipt by the RAN or the CN of the message sent by the UE causes the RAN or CN to perform one or more of: releasing the invalid RRC Connection; initiating a normal RRC connection process to establish a new RRC connection with the UE; releasing an established user plane connection for the UE between the CN and RAN.

42. A UE as set out in clause 37, the UE being configure such that, when the UE selects a cell of the RAN in which the suspended RRC Connection represented by the stored RRC connection data is invalid, the UE continues to store the RRC connection data and transmits a message informing the RAN or the CN of this event.

43. A UE as set out in any of clauses 32-42, further comprising the UE being configured such that, as part of the RRC connection reactivation process:
   the UE determines whether or not the suspended RRC connection is still valid by reference to the stored RRC connection data; and
   in response to the UE determining that the suspended RRC connection is still valid, the UE sends an RRC connection reactivation request message to the RAN.

44. A UE as set out in clause 43, further comprising:
   the UE being configured such that, in response to receiving an RRC connection reactivation complete message from the RAN, the UE resumes user plane data transfer with the RAN over the reactivated RRC connection.

45. A UE as set out in clause 43, further comprising:
   the UE being configured such that, in response to receiving an RRC connection reactivation reject message from the RAN, the UE releases the suspended RRC connection and entering idle mode; and the UE configured to thereafter initiate a normal RRC connection establishment process to establish a new RRC connection with the RAN.

46. A UE as set out in clause 43, wherein a RAN node transmits the RRC connection reactivation reject message to the UE in response to the RAN node determining that it does not have a valid suspended RRC connection for the UE.

47. A UE as set out in any of clauses 32-48, further comprising the UE being configured to:
determine whether or not the suspended RRC connection is still valid by reference to the stored RRC connection data;
in response to the UE determining that the suspended RRC connection is invalid, release the suspended RRC connection and enters idle mode; and
thereafter initiate a normal RRC connection establishment process to establish a new RRC connection with the RAN.

48. A UE as set out in any of clauses 43-47, further comprising the UE being configured to, as part of determining whether or not the suspended RRC connection is still valid, determine at least one of:
whether the UE is currently in a cell of the RAN in which the suspended RRC Connection represented by the stored RRC connection data is still valid; and
whether a timer has not expired.

49. A UE as set out in any of clauses 43-48, further comprising the UE being configured to relinquish mobility control of the UE to the RAN as a result of the reactivation of the suspended RRC connection or the establishment of a new RRC connection.

50. A UE as set out in any of clauses 32-49, further comprising the UE being configured to initiate the reactivation of the suspended RRC connection reactivation process in response to at least one of:
the UE generating uplink data via the user plane of an RRC connection;
reception at the UE of paging; and
reception at the UE of a message indicating that the RAN or the CN has downlink data buffered to send to the UE over the user plane of an RRC connection.

51. A UE as set out in any of clauses 32-50, wherein the UE is configured to communicate with the RAN in accordance with the LTE or LTE Advanced protocols.

52. A wireless communications system comprising a UE as set out in any of clauses 32-51, and a RAN having an established user plane connection with a Core Network (CN) for the UE, the system being configured to maintain the established user plane connection between the RAN and the CN while the RRC Connection is suspended.

53. A wireless communications system as set out in clause 52, further comprising the RAN node for which the suspended RRC connection is valid being configured such that when the RAN node receives from the CN downlink data for the UE, the RAN node buffers the downlink data and pages the UE or transmits a notification of downlink data for the UE.

54. A wireless communications system as set out in clause 53, further comprising the RAN node being configured such that, in response to the RAN node receiving no response from the UE to the paging or to the notification of downlink data, the RAN node sends to the CN a paging escalation message.

55. A wireless communications system comprising a UE as set out in any of clauses 32-51, and a RAN, the wireless communications system being configured such that the UE or a RAN node sends a message to inform any node in the Core Network (CN) that the RRC connection is suspended.

56. A wireless communications system as set out in clause 55, wherein the RAN has an established user plane connection with the CN for the UE, the wireless communications system being configured such that the wireless communications system suspends the established user plane connection between the CN and the RAN.

57. A wireless communications system as set out in clause 56, further comprising the wireless communications system being configured such that the message sent to the CN includes an identification of the UE, and such that, to suspend the established user plane connection between the CN and the RAN, the RAN or one or more nodes in the CN or both:
discontinue transmission and reception of user plane data for the UE over the user plane connection between the RAN and the CN; and
store CN-RAN connection data representing the established user plane connection, said CN-RAN connection data being usable to later resume transmission and reception of user plane data to the UE by resuming said user plane connection between the RAN and the CN as the result of an RRC connection reactivation process.

58. A wireless communications system as set out in clauses 56 or 57, further comprising the wireless communications system being configured such that, when downlink data for the UE is received at the CN, a node of the CN buffers the downlink data and the CN initiates the paging of the UE by one or more cells of the RAN.

59. A wireless communications system as set out in clauses 55, 57 or 58, further comprising the wireless communications system being configured such that a node of the CN maintains a validity indicator tor the UE, said validity indicator being usable in checking the validity of the said RRC connection as part of the RRC connection reactivation process.

60. A wireless communications system as set out in clause 59, wherein the value of the validity indicator is dependent on one or more of: the location of the UE; a timer.

61. A wireless communications system as set out in any of clauses 52-60, wherein the RAN is configured to communicate with the UE in accordance with the LTE or LTE Advanced protocols.

62. A wireless communications system as set out in any of clauses 52-60, wherein the RAN node or nodes is/are eNode B(s).

63. A computer program product having instructions which when carried out by a processor of User Equipment (UE) for use with a Radio Access Network (RAN) cause the UE to be configured to operate in accordance with a method as set out in any of clauses 1-31.

64. A computer program product having instructions which when carried out by a processor of a node of a Radio Access Network (RAN) for use with a user equipment (UE) cause the RAN node to be configured to operate in accordance with a method as set out in any of clauses 1-31.

Aspects of the present disclosure relating to the operation of a RAN node to suspend ah RRC connection will now be set out in the following numbered clauses.

1. A method, implemented in a node of a Radio Access Network (RAN) for use with a user equipment (UE), comprising:
the RAN node suspending an established RRC connection with the UE;
the RAN node thereafter being operable, whilst the RRC connection is suspended, to page the UE paging or transmit notification of downlink data for the UE or both; and the RAN node storing RRC connection data related to the suspended RRC connection, said RRC connection data being usable by the RAN node to reactivate the suspended RRC connection.

2. A method as set out in clause 1, wherein RRC connection data comprises data representing one or more of:
the configuration of radio bearers in the established RRC connection;
security parameters relating to the established RRC connection;
temporary cell identifiers;
MAC configuration;
Physical Layer configuration.

3. A method as set out in clause 1 or 2, further comprising marking the stored RRC connection data to indicate the suspension of the RRC connection.

4. A method as set out in clause 1, 2 or 3 wherein the RAN node suspends the established RRC connection in response to an RRC connection suspension criterion being met.

5. A method as set out in clause 4, the RRC connection suspension criteria comprising one or more of:
the expiry of a timer at the RAN Node;
transmission of a message by the RAN node to the UE to instruct suspension of the established RRC Connection.

6. A method as set out in any of clauses 1-5, wherein the RAN node has an established user plane connection with a Core Network (CN) for the UE, the method further comprising maintaining the established user plane connection between the RAN node and the CN while the RRC Connection is suspended.

7. A method as set out in clause 6, wherein when the RAN node receives from the CN downlink data for the UE, the RAN node buffers the downlink data and pages the UE a or transmits a notification of downlink data for the UE.

8. A method as set out in clause 7, wherein, in response to the RAN node receiving no response from the UE to the paging or to the notification of downlink data, the RAN node sends to the CN a paging escalation message.

9. A method as set out in any of clauses 1-5, further comprising the UE or the RAN node sending a message to inform any node in the Core Network (CN) that the RRC connection is suspended.

10. A method as set out in clause 9, wherein the RAN node has an established user plane connection with a CN for the UE, the method further comprising suspending the established user plane connection between the CN and the RAN for the UE.

11. A method as set out in clause 10, wherein the message sent to the CN includes an identification of the UE, the method further comprising the RAN node or one or more ON nodes or both:
discontinuing transmission and reception of user plane data for the UE over the established user plane connection between the CN and the RAN node; and
storing CN-RAN connection data representing the established user plane connection with the CN, said CN-RAN connection data being usable to later resume transmission and reception of user plane data to the UE by reactivating said user plane connection between the CN and the RAN node as the result of an RRC connection reactivation process.

12. A method as set out in clauses 10 or 11, wherein when downlink data for the UE is received at the CN, a node of the CN buffers the downlink data and the CN initiates the paging of the UE by one or more cells of the RAN.

13. A method as set out in clauses 10, 11 or 12, further comprising a node of the CN maintaining a validity indicator for the UE, said validity indicator being usable in checking the validity of the said RRC connection as part of the RRC connection reactivation process.

14. A method as set out in clause 13, wherein the value of the validity indicator is dependent on one or more of: the location of the user; a timer.

15. A method as set out in any preceding clause, further comprising:
the RAN relinquishing to the UE, mobility control of the UE until the RAN resumes mobility control of the UE as the result of the reactivation of the suspended RRC connection or a normal RRC connection process to establish a new RRC connection with the UE.

16. A method as set out in clause 15, wherein when the UE selects a cell of the RAN in which the suspended RRC Connection represented by the stored RRC connection data is invalid, the RAN receiving a message informing the RAN of this event.

17. A method as set out in clause 16, wherein receipt by the RAN of the message sent by the UE causes the RAN to perform one or more of: release the invalid suspended RRC Connection; initiate a new RRC connection with the UE; release an established user plane connection for the UE between the CN and RAN.

18. A method as set out in clause 15, 16 or 17, further composing the RAN resuming mobility control of the UE as a result of reactivation of the suspended RRC connection or a normal RRC connection process to establish a new RRC connection with the UE.

19. A method as set out in any preceding clause, wherein the RAN node/in response to receiving an RRC connection reactivation request message from the UE:
determining whether or not the suspended RRC connection is still valid by reference to the stored RRC connection data; and
in response to the RAN node determining that the suspended RRC connection is still valid, sending a reactivation request complete message to the UE and thereafter resuming user plane data transfer with the UE over the reactivated RRC connection; or
in response to the RAN node determining that the suspended RRC connection is invalid, sending a reactivation request reject message to the UE.

20. A method as set out in clause 19, wherein the RAN node determining whether or not the suspended RRC connection is still valid comprises at least one of:
determining that a timer has not expired; and
determining that the RRC connection has not been released.

21. A method as set out in any preceding clause, wherein the UE is configured to communicate with the RAN in accordance with the LTE or LTE Advanced protocols.

22. A method as set out in any preceding clause, wherein the RAN is configured to communicate with the UE in accordance with the LTE or LTE Advanced protocols.

23. A method as set out in any preceding clause, wherein the RAN node or nodes is/are eNode B(s).

24. A node of a Radio Access Network (RAN) for use with a user equipment (UE), the RAN node being configured to:
suspend an established RRC connection with the UE;
thereafter be operable, whilst the RRC connection is suspended, to page the UE or transmit notification of downlink data for the UE or both; and
store RRC connection data related to the suspended RRC connection, said RRC connection data being usable by the RAN node reactivate the suspended RRC connection.

25. A RAN node as set out in clause 24, wherein RRC connection data comprises data representing one or more of:
   the configuration of radio bearers in the established RRC connection;
   security parameters relating to the established RRC connection;
   temporary cell identifiers;
   MAC configuration;
   Physical Layer configuration.

26. A RAN node as set out in clause 24 or 25, further comprising marking the stored RRC connection data to indicate the suspension of the RRC connection.

27. A RAN node as set out in clause 24, 25 or 26, further comprising the RAN node being configured to suspend the established RRC connection in response to an RRC connection suspension criterion being met 28. A RAN node as set out in clause 27, wherein the RRC connection suspension criteria comprises one or more of:
   the expiry of a timer at the RAN Node;
   transmission of a message by the RAN node to the UE to instruct suspension of the established RRC connection.

23. A RAN node as set out in any of clauses 24-28, further comprising the RAN node being configure to, in response to receiving an RRC connection reactivation request message from the UE:
   determine whether or not the suspended RRC connection is still valid by reference to the stored RRC connection data;
   in response to the RAN node determining that the suspended RRC connection is still valid, send a reactivation request complete message to the UE and thereafter resuming user plane data transfer with the UE over the reactivated RRC connection; and
   in response to the RAN node determining that the suspended RRC connection is invalid, send a reactivation request reject message to the UE.

30. A RAN node as set out in clause 29, the RAN node being configured such that the RAN node determining whether or not the suspended RRC connection is still valid comprises at least one of:
   determining that a timer has not expired; and
   determining that the RRC connection has not been released.

31. A RAN node as set out in clause 29 or 30, further comprising the RAN resuming mobility control of the UE as a result of reactivation of the suspended RRC connection or a normal RRC connection process to establish a new RRC connection with the UE.

32. A RAN node as set out in any of clauses 24-31, wherein the RAN node is configured to communicate with the UE in accordance with the LTE or LTE Advanced protocols.

33. A RAN node as set out in any preceding clause, wherein the RAN node is an eNode B.

34. A RAN node as set out in any of clauses 24-33, wherein the RAN node has an established user plane connection with a Core Network (CN) for the UE, further comprising maintaining the established user plane connection between the RAN node and the CN while the RRC Connection is suspended.

35. A RAN node as set out in clause 34, the RAN node being configured such that, when the RAN node receives from the CN downlink data for the UE, the RAN node buffers the downlink data and pages the UE or transmits a notification of downlink data for the UE.

36. A RAN node as set out in clause 35, the RAN node being configured such that, in response to the RAN node receiving no response from the UE to the paging or to the notification of downlink data, the RAN node sends to the CN a paging escalation message.

37. A RAN node as set out in any of clauses 24-33, further comprising the UE or the RAN node sending a message to inform any node in the Core Network (CN) that the RRC connection is suspended.

38. A RAN node as set out in clause 37, wherein the RAN node has an established user plane connection with a CN for the UE, further comprising suspending the established user plane connection between the CN and the RAN for the UE.

39. A RAN node as set out in clause 38, wherein the message sent to the CN includes an identification of the UE, the RAN node or one or more CN nodes or both being configured to:
   discontinue transmission and reception of user plane data for the UE over the established user plane connection between the CN and the RAN node; and
   store CN-RAN connection data representing the established user plane connection with the CN, said CN-RAN connection data being usable to later resume transmission and reception of user plane data to the UE by resuming said user plane connection between the CN and the RAN node as the result of an RRC connection reactivation process.

40. A wireless communication system comprising a RAN node as set out in clauses 38 or 39 and a CN, wherein the CN is configured such that when downlink data for the UE is received at the CN, a node of the CN buffers the downlink data and the CN initiates the paging of the UE by one or more cells of the RAN.

41. A wireless communication system comprising a RAN node as set out in clauses 38 or 39 and a CN or a wireless communication system as set out in clause 40, further comprising the wireless communication system being configured such that a node of the CN maintains a validity indicator for the UE, said validity indicator being usable in checking the validity of the said RRC connection as part of the RRC connection reactivation process.

42. A wireless communication system as set out in clause 41, wherein the value of the validity indicator is dependent on one or more of: the location of the user; a timer.

43. A RAN including a RAN node as set out in any of clauses 24-39, further comprising:
   the RAN being configured to relinquish to the UE, mobility control of the UE until the RAN resumes mobility control of the UE as the result of an RRC connection reactivation process or a normal RRC connection process to establish a new RRC connection with the UE.

44. A RAN as set out in clause 43, wherein when the UE selects a cell of the RAN in which the suspended RRC Connection represented by the stored RRC connection data is invalid, the RAN receives a message informing the RAN of this event.

45. A RAN as set out in clause 44, wherein the RAN is configured such that receipt by the RAN of the message sent by the UE causes the RAN to perform one or more of: release the invalid suspended RRC Connection; initiate a new RRC connection with the UE; release an established user plane connection for the UE between the CN and RAN.

46. A computer program product having instructions which when carried out by a processor of a node of a Radio Access Network (RAN) for use with a user equipment (UE) cause the RAN node to be configured to operate in accordance with a method as set out in any of clauses 1-23.

Aspects of the present disclosure relating to the operation of a CN node to suspend an RRC connection will now be set out in the following numbered clauses.

1. A method, implemented in a node of a Core Network (CN) for use with a node of a Radio Access Network (RAN), comprising, in response to the CN receiving a message indicating that an RRC connection between the RAN and a user equipment (UE) is suspended:
the CN node discontinuing transmission and reception of user plane data for the UE over an established user plane CN-RAN connection between the CN and the RAN node; and
storing CM-RAN connection data representing the established user plane connection with the CN, said CN-RAN connection data being usable to later resume transmission and reception of user plane data to the UE by resuming said user plane connection between the CN and the RAN node as the result of the RRC connection being reactivated.

2. A method as set out in clause 1, wherein when downlink data for the UE is received at the CN, the method further comprising buffering the downlink data in a node of the CN and initiating the paging of the UE by one or more cells of the RAN.

3. A method as set out in clause 1 or 2, further comprising, in response to receiving a CN-RAN connection reactivation, message at a node of the CN, resuming user plane data transfer between the CN and the RAN.

4. A method as set out in any preceding clause, wherein the CN node is part of an Evolved Packet Core (EPC) configured to communicate in accordance with the LTE or LTE Advanced protocols.

5. A node of a Core Network (CN) for use with a Radio Access Network (RAN), the node of the CN being configured to, in response to the CN receiving a message indicating that an RRC connection between the RAN and a user equipment (UE) is suspended:
discontinue transmission and reception of user plane data for the UE over an established user plane CN-RAN connection between the CN and the RAN node; and
store CN-RAN connection data representing the established user plane connection with the CN, said CN-RAN connection data being usable to later resume transmission and reception of user plane data to the UE by resuming said user plane connection between the CN and the RAN node as the result of the RRC connection being reactivated.

6. A CN node as set out in clause 5, the CN node being configured such that, when downlink data for the UE is received at the CN, the CN node buffers the downlink data and initiates the paging of the UE by one or more cells of the RAN.

7. A CN node as set out in clause 5 or 6, further comprising the CN node, in response to receiving a CN-RAN connection reactivation message at a node of the CN, resuming user plane data transfer with the RAN.

8. A CN node as set out in clause 5, 6 or 7, wherein the CN node is part of an Evolved Packet Core (EPC) configured to communicate in accordance with the LTE or LTE Advanced protocols.

9. A computer program product having instructions which when carried out by a processor of a node of a Core Network (CN) for use with a Radio Access Network (RAN) cause the node of the CN to be configured to operate in accordance with a method as set cot in any of clauses 1-4.

Aspects of the present disclosure relating to the operation of a UE or a RAN node for assessing the validity of a suspended RRC connection and reactivating a suspended RRC connection will now be set out in the following numbered clauses.

1. A method, implemented in a node of a Radio Access Network (RAN) for use with a user equipment (UE), an established RRC connection between the RAN node and a UE having been suspended and RRC connection data related to the suspended RRC connection having been stored by the RAN node, the method comprising:
receiving at the RAN node an RRC connection reactivation request message from the UE;
determining whether or not the suspended RRC connection is still valid by reference to the stored RRC connection data; and
in response to the RAN node determining that the suspended RRC connection is still valid, the RAN node sending a reactivation request complete message to the UE and thereafter resuming user plane data transfer with the UE over the reactivated RRC connection; or
in response to the RAN node determining that the suspended RRC connection is invalid, the RAN node sending a reactivation request reject message to the RAN.

2. A method as set out in clause 1, wherein the RAN node determining whether or not the suspended RRC connection is still valid comprises at least one of:
determining that a timer has not expired; and
determining that the RRC connection has not been released.

3. A method as set out in clause 1 or 2, further comprising the RAN resuming mobility control of the UE from the UE as a result of reactivation of the suspended RRC connection or a normal RRC connection process to establish a new RRC connection with the UE.

4. A method as set out in any preceding clause, wherein the RAN node or nodes is/are configured to communicate with the UE in accordance with the LTE or LTE Advanced protocols.

5. A method as set out in any preceding clause, wherein the RAN node or nodes is/are eNode B(s).

6. A node of a Radio Access Network (RAN) for use with a user equipment (UE), the RAN node being configured such that when an established RRC connection between the RAN node and a UE has been suspended and RRC connection data related to the suspended RRC connection has been stored by the RAN node, in response to receiving at the RAN node an RRC connection reactivation request message from the UE:
the RAN node determines whether or not the suspended RRC connection is still valid by reference to the stored RRC connection data;
in response to the RAN node determining that the suspended RRC connection is still valid, the RAN node sends a reactivation request complete message to the UE and thereafter resuming user plane data transfer with the UE over the reactivated RRC connection; and
in response to the RAN node determining that the suspended RRC connection is invalid, the RAN node sends a reactivation request reject message to the RAN.

7. A RAN node as set out in clause 6, further comprising the RAN node being configured to determine whether or not the suspended RRC connection is still valid by at least one of the RAN node:
determining that a timer has not expired; and
determining that the RRC connection has not been released.

8. A RAN comprising a RAN node as set out in clause 5 or 6, the RAN being configured to resume mobility control of the UE from the UE as a result of reactivation of the suspended RRC connection or a normal RRC connection process to establish a new RRC connection with the UE.

9. A RAN node as set out in any of clauses 5-8, the RAN node or nodes being configured to communicate with the UE in accordance with the LTE or LTE Advanced protocols.

10. A RAN node as set out in any of clauses 5-9, wherein the RAN node or nodes is/are eNode B(s).

11. A computer program product having instructions which when carried out by a processor of a node of a Radio Access Network (RAN) for use with a user equipment (UE) cause the RAN node to be configured to operate in accordance with a method as set out in any of clauses 1-5.

12. A method, implemented in a user equipment (UE) for use with a Radio Access Network (RAN), an established RRC connection between a node of the RAN and the UE having been suspended and RRC connection data related to the suspended RRC connection having been stored by the UE, the method comprising:
    the UE determining whether or not the suspended RRC connection is still valid by reference to the stored RRC connection data; and
    in response to the UE determining that the suspended RRC connection is still valid, the UE: transmitting to the RAN node an RRC connection reactivation request message; and, in response to receiving from the RAN node an RRC connection reactivation accept message, the UE thereafter resuming user plane data transfer with the RAN node over the reactivated RRC connection, or in response to receiving from the RAN node an RRC connection reactivation reject message, the UE releasing the RRC connection;
    or
    in response to the UE determining that the suspended RRC connection is invalid, the UE releasing the RRC connection.

13. A method as set out in clause 12, wherein the UE determining whether or not the suspended RRC connection is still valid comprises at least one of:
    determining whether the UE is currently in a cell of the RAN in which the suspended RRC Connection represented by the stored RRC connection data is still valid; and
    determining whether a timer has not expired.

14. A method as set out in clause 12 or 13, further comprising, in response to receiving RRC connection reactivation reject message or the UE determining that the suspended RRC connection is invalid, the UE also entering idle mode and thereafter initiating a normal RRC connection establishment process to establish a new RRC connection with the RAN.

15. A method as set out in clause 12, 13 or 14, further comprising the UE relinquishing mobility control of the UE to the RAN as a result of reactivation of the suspended RRC connection or a normal RRC connection process to establish a new RRC connection with the RAN.

16. A method as set out in any of clauses 12-15, wherein the UE is configured to communicate with the RAN in accordance with the LTE or LTE Advanced protocols.

17. A User Equipment (UE) for use with a Radio Access Network (RAN), the UE being configured such that when an established RRC connection between a node of the RAN and the UE has been suspended and RRC connection data representing configuration information and state information related to the suspended RRC connection has been stored by the UE:
    the UE determines whether or not the suspended RRC connection is still valid by reference to the stored RRC connection data;
    in response to the UE determining that the suspended RRC connection is still valid, the UE transmits to the RAN node an RRC connection reactivation request message; and, in response to receiving from the RAN node an RRC connection reactivation accept message, the UE thereafter resumes user plane data transfer with the RAN node over the reactivated RRC connection, or in response to receiving from the RAN node an RRC connection reactivation reject message, the UE releases the RRC connection; and
    in response to the UE determining that the suspended RRC connection is invalid, the UE releases the RRC connection.

18. A UE set out in clause 17, further comprising the UE being configured to determine whether or not the suspended RRC connection is still valid by at least one of the UE;
    determining whether the UE is currently in a cell of the RAN in which the suspended RRC Connection represented by the stored RRC connection data is still valid; and
    determining whether a timer has not expired.

19. A UE as set out in clause 17 or 18, further comprising the UE being configured such that, in response to receiving RRC connection reactivation reject message or the UE determining that the suspended RRC connection is invalid, the UE also enters idle mode and thereafter initiates a normal RRC connection establishment process to establish a new RRC connection with the RAN.

20. A UE as set out in clause 17, 18 or 19, further comprising the UE being configured to relinquish mobility control of the UE to the RAN as a result of the reactivation of the suspended RRC connection or a normal RRC connection process to establish a new RRC connection with the RAN.

21. A UE as set out in any of clauses 17-20, wherein the UE is configured to communicate with the RAN in accordance with the LTE or LTE Advanced protocols.

22. A computer program product having instructions which when carried out by a processor of User Equipment (UE) for use with a Radio Access Network (RAN) connection cause the UE to be configured to operate in accordance with a method as set out in any of clauses 12-16.

Aspects of the present disclosure relating to the operation of a CN node or a RAN node for handling downlink data while an RRC connection is suspended will now be set out in the following numbered clauses.

1. A method, implemented in a node of a Radio Access Network (RAN) for use with a user equipment (UE), an established RRC connection between a RAN node and a UE having been suspended and RRC connection data related to the suspended RRC connection having been stored by the RAN node, the method comprising:
    the RAN node receiving downlink data for the UE;
    the RAN node buffering the downlink data; and
    the RAN node paging the UE or transmitting notification of downlink, data for the UE.

2. A method as set out in clause 1, wherein, in response to the RAN node receiving no response from the UE to the paging or to the notification of downlink data, the RAN node sends to the CN a paging escalation message.

3. A method as set out in clause 2, further comprising:
    receiving at the RAN node an RRC connection reactivation request message from the UE;
    determining whether or not the suspended RRC connection is still valid by reference to the stored RRC connection data; and
    in response to the RAN node determining that the suspended RRC connection is still valid, the RAN node sending a reactivation request complete message to the UE and thereafter resuming user plane data transfer with the UE over the reactivated RRC connection; or in response to the RAN node determining that the suspended RRC connection is invalid, the RAN node sending a reactivation request reject message to the RAN.

4. A method as set out in any preceding clause, wherein the RAN node is configured to communicate with the UE in accordance with the LTE or LTE Advanced protocols.

5. A method as set out in any preceding clause, wherein the RAN node is an eNode B.

6. A node of a Radio Access Network (RAN) for use with a user equipment (UE), the RAN node being configured such that when an established RRC connection between the RAN node and a UE has been suspended and RRC connection date related to the suspended RRC connection has been stored by the RAN node, in response to the RAN node receiving downlink data for the UE:

the RAN node buffers the downlink data; and the RAN node pages the UE or transmits a message giving notification of downlink data.

7. A RAN node as set out in clause 6, the RAN node being configured such that, in response to the RAN node receiving no response from the UE to the paging message or to the message giving notification of downlink data, the RAN node sends to the CN a paging escalation message.

8. A RAN node as set out in clause 6, further comprising the RAN node being configured such that, in response to the RAN node receiving an RRC connection reactivation request message from the UE:

the RAN node determines whether or not the suspended RRC connection is still valid by reference to the stored RRC connection date;

in response to the RAN node determining that the suspended RRC connection is still valid, the RAN node sends a reactivation request complete message to the UE and thereafter resuming user plane data transfer with the UE over the reactivated RRC connection; and in response to the RAN node determining that the suspended RRC connection is invalid, the RAN node sends a reactivation request reject message to the RAN.

9. A RAN node as set out in any of clauses 6-8, wherein the RAN node is configured to communicate with the UE in accordance with the LTE or LTE Advanced protocols.

10. A method as set out in any of clauses 8-9, wherein the RAN node is an eNode B.

11. A computer program product having instructions which when carried out by a processor of a node of a Radio Access Network (RAN) for use with a user equipment (UE) cause the RAN node to be configured to operate in accordance with a method as set out in any of clauses 1-5.

12. A method, implemented in a node of a Core Network (CN) for use with a node of a Radio Access Network (RAN), the transmission and reception of user plane data for a user equipment (UE) over an established user plane CN-RAN connection for the UE between the CN and the RAN node having been discontinued in response to the CN receiving a message indicating that an RRC connection between the RAN and the UE is suspended and CN-RAN connection data representing the extant user plane connection between the CN and the RAN having been stored, the method comprising:

receiving downlink data for the UE;

the CN node buffering the downlink data;

the CN node initiating the paging of the UE by one or more cells of the RAN.

13. A method as set out in clause 12, further comprising a node of the CN maintaining a validity indicator for the UE, said validity indicator being usable in checking the validity of the said RRC connection as part of a RRC connection reactivation process.

14. A method as set out in clause 13, wherein the value of the validity indicator is dependent on one or more of: the location of the user; a timer.

15. A method as set out in any of clauses 12-14, wherein the CN node is part of an Evolved Packet Core (EPC) configured to communicate in accordance with the LTE or LTE Advanced protocols.

16. A node of a Core Network (CN) for use with a node of a Radio Access Network (RAN), the CN node being configured such that when the transmission and reception of user plane data for a user equipment (UE) over an established user plane CN-RAN connection for the UE between the CN end the RAN node has been discontinued in response to the CN receiving a message indicating that an RRC connection between the RAN and the UE is suspended and CN-RAN connection data representing the extant user plane connection between the CN and the RAN has been stored, in response to receiving downlink data for the UE:

the CN node buffers the downlink data;

the CN node initiates the paging of the UE by one or more cells of the RAN.

17. A CN node as set out in clause 16, further comprising a node of the CN maintaining a validity indicator for the UE, said validity indicator being usable in checking the validity of the said RRC connection as part of a RRC connection reactivation process.

18. A CN node as set out in clause 17, wherein the value of the validity indicator is dependent on one or more of: the location of the user; a timer.

19. A CN node as set out in any of clauses 16-18, wherein the CN node is part of an Evolved Packet Core (EPC) configured to communicate in accordance with the LTE or LTE Advanced protocols.

20. A computer program product having instructions which when carried out by a processor of a node of a Core Network (CN) for communicating with a Radio Access Network (RAN) via a CN-RAN connection cause the node of the CN to be configured to operate in accordance with a method as set out in any of clauses 12-15.

Aspects of the present disclosure relating to the operation of a UE for handling mobility of the UE while an RRC connection is suspended will now be set out in the following numbered clauses.

1. A method, implemented in a user equipment (UE) for use with a Radio Access Network (RAN), an established RRC connection between a node of the RAN and the UE having been suspended and RRC connection data related to the suspended RRC connection having been stored by the UE, the method comprising:

the UE performing autonomous mobility control by cell selection or reselection processes during the time that the RRC connection is suspended and the UE relinquishing mobility control of the UE to the RAN as a result of reactivation of the suspended RRC connection or a normal RRC connection process to establish a new RRC connection with the UE.

2. A method as set out in clause 1, wherein when the UE selects a cell of the RAN in which the suspended RRC connection represented by the RRC connection data is invalid, the UE continues to store the RRC connection data and omits to perform any communication with the CN to inform the CN of the mobility of the UE.

3. A method as set out in clause 1, wherein when the UE selects a cell of the RAN in which the suspended RRC connection represented by the stored RRC connection data is invalid, the UE transmits a message informing the RAN or a core network (CN) of this event.

4. A method as set out in clause 3, wherein the UE also releases the suspended RRC connection end enters idle mode as the result of selecting a cell of the RAN in which the RRC connection represented by the stored RRC connection data is invalid.

5. A method as set out in any preceding clause, wherein the UE is configured to communicate with the RAN in accordance with the LTE or LTE Advanced protocols.

6. A User Equipment (UE) for communicating with a Radio Access Network (RAN), the UE being configured such that when an established RRC connection between a node of the RAN and the UE has been suspended and RRC connection data related to the suspended RRC connection has been stored by the UE:
the UE performs autonomous mobility control by cell selection or reselection processes, during the time that the RRC connection is suspended; and
the UE relinquishes mobility control of the UE to the RAN as a result of the reactivation of the suspended RRC connection or a normal RRC connection process to establish a new RRC connection with the UE.

7. A UE as set out in clause 6, further comprising the UE being configured such that, when the UE selects a cell of the RAN in which the suspended RRC connection represented by the RRC connection data is invalid, the UE continues to store the RRC connection data and omits to perform any communication with the CN to inform the CN of the mobility of the UE.

8. A UE as set out in clause 6, further comprising the UE being configured such that, when the UE selects a cell of the RAN in which the suspended RRC connection represented by the stored RRC connection data is invalid, the UE transmits a message informing the RAN or a core network (ON) of this event.

9. A UE as set out in clause 8, further comprising the UE being configured such that the UE also releases the suspended RRC connection and enters idle mode as the result of selecting a cell of the RAN in which the RRC connection represented by the stored RRC connection data is invalid.

10. A UE as set out in any of clauses 8-9, wherein the UE is configured to communicate with the RAN in accordance with the LTE or LTE Advanced protocols.

11. A computer program product having instructions which when carried out by a processor of User Equipment (UE) for use with a Radio Access Network (RAN) connection cause the UE to be configured to operate in accordance with a method as set out in any of clauses 1-5.

The invention claimed is:

1. A method, comprising:
suspending, by a first Core Network (CN) node, an established user plane connection between a Radio Access Network (RAN) node and a second CN node, wherein the suspending causes the second CN node to release the established user plane connection to become a suspended user plane connection;
in response to the suspending, storing, at the first CN node, CN-RAN connection data representing the established user plane connection;
receiving, at the first CN node, a connection reactivation message indicating a resumption of the suspended user plane connection; and
resuming the suspended user plane connection based on the stored CN-RAN connection data.

2. The method of claim 1, wherein the resuming is based on the stored CN-RAN connection data being valid, and whether the stored CN-RAN connection data is valid is determined based on a validity indicator stored at the first CN node.

3. The method of claim 2, wherein the validity indicator is determined based on at least one of: a location of the UE, or a timer.

4. The method of claim 1, wherein the CN-RAN connection data includes user plane bearer context associated with the UE.

5. The method of claim 1, wherein the first CN node and the second CN node are part of an Evolved Packet Core (EPC) that communicates in accordance with Long-Term Evolution (LTE) or LTE Advanced protocols.

6. The method of claim 1, wherein the first CN node is a mobility management entity (MME), and the second CN node is a serving gateway (S-GW).

7. The method of claim 1, wherein the established user plane connection and the suspended user plane connection are associated with a user equipment.

8. A first Core Network (CN) node, comprising:
a memory; and
at least one hardware processor communicatively coupled with the memory and configured to:
suspend an established user plane connection between a Radio Access Network (RAN) node and a second CN node, wherein the suspending causes the second CN node to release the established user plane connection to become a suspended user plane connection;
in response to the suspending, store CN-RAN connection data representing the established user plane connection;
receive a connection reactivation message indicating a resumption of the suspended user plane connection; and
resume the suspended user plane connection based on the stored CN-RAN connection data.

9. The first CN node of claim 8, wherein the resuming is based on the stored CN-RAN connection data being valid, and whether the stored CN-RAN connection data is valid is determined based on a validity indicator stored at the first CN node.

10. The first CN node of claim 9, wherein the validity indicator is determined based on at least one of: a location of the UE, or a timer.

11. The first CN node of claim 8, wherein the CN-RAN connection data includes user plane bearer context associated with the UE.

12. The first CN node of claim 8, wherein the first CN node and the second CN node are part of an Evolved Packet Core (EPC) that communicates in accordance with Long-Term Evolution (LTE) or LTE Advanced protocols.

13. The first CN node of claim 8, wherein the first CN node is a mobility management entity (MME), and the second CN node is a serving gateway (S-GW).

14. The first CN node of claim 8, wherein the established user plane connection and the suspended user plane connection are associated with a user equipment.

15. A non-transitory computer-readable medium containing instructions which, when executed, cause a first Core Network (CN) node to perform operations comprising:
suspending an established user plane connection between a Radio Access Network (RAN) node and a second CN node, wherein the suspending causes the second CN node to release the established user plane connection to become a suspended user plane connection;

in response to the suspending, storing CN-RAN connection data representing the established user plane connection;

receiving a connection reactivation message indicating a resumption of the suspended user plane connection; and resuming the suspended user plane connection based on the stored CN-RAN connection data.

16. The non-transitory computer-readable medium of claim 15, wherein the resuming is based on the stored CN-RAN connection data being valid, and whether the stored CN-RAN connection data is valid is determined based on a validity indicator stored at the first CN node.

17. The non-transitory computer-readable medium of claim 16, wherein the validity indicator is determined based on at least one of: a location of the UE, or a timer.

18. The non-transitory computer-readable medium of claim 15, wherein the CN-RAN connection data includes user plane bearer context associated with the UE.

19. The non-transitory computer-readable medium of claim 15, wherein the first CN node and the second CN node are part of an Evolved Packet Core (EPC) that communicates in accordance with Long-Term Evolution (LTE) or LTE Advanced protocols.

20. The non-transitory computer-readable medium of claim 15, wherein the first CN node is a mobility management entity (MME), and the second CN node is a serving gateway (S-GW).

* * * * *